(12) United States Patent
Karlsson et al.

(10) Patent No.: US 12,370,968 B2
(45) Date of Patent: Jul. 29, 2025

(54) VEHICLE STRUCTURE FOR IMPACT PROTECTION AND A VEHICLE COMPRISING A VEHICLE STRUCTURE FOR IMPACT PROTECTION

(71) Applicant: Scania CV AB, Södertälje (SE)

(72) Inventors: Olof Karlsson, Bleket (SE); Olle Alsing, Svartsjö (SE); Reimert Sjöblom, Åkersberga (SE); Cristofer Söderberg, Täby (SE); Jonas Hagsjö, Huddinge (SE); Martin Hede, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/721,976

(22) PCT Filed: Dec. 16, 2022

(86) PCT No.: PCT/SE2022/051188
§ 371 (c)(1),
(2) Date: Jun. 20, 2024

(87) PCT Pub. No.: WO2023/128850
PCT Pub. Date: Jul. 6, 2023

(65) Prior Publication Data
US 2024/0399991 A1   Dec. 5, 2024

(30) Foreign Application Priority Data
Dec. 27, 2021   (EP) ..................................... 21217860

(51) Int. Cl.
*B60R 19/56*   (2006.01)
*B60K 1/04*   (2019.01)
(Continued)

(52) U.S. Cl.
CPC ................ *B60R 19/56* (2013.01); *B60K 1/04* (2013.01); *B60K 15/067* (2013.01);
(Continued)

(58) Field of Classification Search
CPC .......... B60R 19/56; B60K 1/04; B60K 15/067
See application file for complete search history.

(56) References Cited

U.S. PATENT DOCUMENTS 5,219,197 A * 6/1993 Rich ..................... B60R 19/18
293/121
6,609,740 B2 * 8/2003 Evans .................... B60R 19/18
293/121
(Continued)

FOREIGN PATENT DOCUMENTS

CN   204348779 U   5/2015
CN   205059179 U   3/2016
(Continued)

OTHER PUBLICATIONS

Scania CV AB, European Patent Application No. 21217860.2, Communication pursuant to Article 94(3) EPC, Oct. 8, 2024.
(Continued)

*Primary Examiner* — Faye M Fleming
(74) *Attorney, Agent, or Firm* — Moore & Van Allen PLLC; W. Kevin Ransom

(57) ABSTRACT

A vehicle structure for impact protection, wherein the vehicle structure is attachable to a main body of a vehicle having a front end and a rear end, wherein the vehicle structure comprises a plurality of sections having a longitudinal extension extending in a longitudinal direction; and a front cover comprising a base. The section of the plurality of sections forms one or more longitudinal compartments. The sections of the plurality of sections are arranged beside one another so as to form a cellular structure. The base of the
(Continued)

front cover is configured to be positioned between the front end of the vehicle and the plurality of sections. The front cover covers the plurality of sections and is configured to distribute impact energy to the plurality of sections. A vehicle comprising such a vehicle structure.

20 Claims, 27 Drawing Sheets

(51) Int. Cl.
    *B60K 15/067*     (2006.01)
    *B60R 19/18*     (2006.01)
(52) U.S. Cl.
    CPC ............ *B60K 2001/0438* (2013.01); *B60K 2015/0675* (2013.01); *B60R 2019/1866* (2013.01)

(56) References Cited

U.S. PATENT DOCUMENTS

| | | | |
|---|---|---|---|
| 2007/0257497 A1 * | 11/2007 | Heatherington | B60R 19/18 293/120 |
| 2017/0307137 A1 | 10/2017 | Tyan et al. | |
| 2018/0058530 A1 | 3/2018 | Tyan | |
| 2021/0094401 A1 | 4/2021 | Hara et al. | |

FOREIGN PATENT DOCUMENTS

| | | | | |
|---|---|---|---|---|
| CN | 206141485 U | | 5/2017 | |
| DE | 19611934 C1 | * | 4/1997 | ............ B60R 19/04 |
| DE | 102015002693 A1 | | 9/2016 | |
| DE | 102020116312 A1 | | 12/2020 | |
| EP | 3747736 A1 | | 12/2020 | |
| FR | 2804649 A1 | * | 8/2001 | ............ B62D 25/08 |
| GB | 2521764 A | | 7/2015 | |
| WO | 2012025166 A1 | | 3/2012 | |
| WO | WO-2016193935 A1 | * | 12/2016 | ............ B60R 19/18 |
| WO | WO-2020179914 A1 | * | 9/2020 | ............ B60R 19/04 |
| WO | 2020207581 A1 | | 10/2020 | |

OTHER PUBLICATIONS

Scania CV AB, International Patent Application No. PCT/SE2022/051188, International Preliminary Report on Patentability, Jun. 20, 2024.
Scania CV AB, International Patent Application No. PCT/SE2022/051188, International Search Report, Feb. 6, 2023.
Scania CV AB, International Patent Application No. PCT/SE2022/051188, Written Opinion, Feb. 6, 2023.
Scania CV AB, European Patent Application No. 21217860.2, Extended European Search Report, Jul. 11, 2022.

* cited by examiner

VEHICLE STRUCTURE FOR IMPACT PROTECTION AND A VEHICLE COMPRISING A VEHICLE STRUCTURE FOR IMPACT PROTECTION

CROSS-REFERENCE TO RELATED APPLICATIONS

This application is a National Stage Patent Application (filed under 35 § U.S.C. 371) of PCT/SE2022/051188, filed Dec. 16, 2022, of the same title, which, in turn claims priority to European Patent Application No. 21217860.2 filed Dec. 27, 2021, of the same title; the contents of each of which are hereby incorporated by reference.

TECHNICAL FIELD

Aspects of the present invention relate to a vehicle structure for impact protection, the vehicle structure being attachable to a main body of a vehicle. Further, aspects of the present invention relate to a vehicle comprising such a vehicle structure for impact protection.

BACKGROUND

In general, when designing a vehicle, impact protection of the driver, of a passenger, of certain equipment of the vehicle and of the vehicle itself may be considered. When designing the vehicle in view of impact protection, there is often a compromise between weight and strength. The weight of any impact protection structure should not be too great in view of material and production costs and in view of energy consumption for the propulsion of the vehicle. Still, the impact protection structure should be strong enough to sufficiently withstand or counteract an impact or an overload, for example due to a collision with an external object, such as another vehicle or any other stationary object.

SUMMARY

The inventors of the present invention have found that the design of the vehicle, for example the design of the impact protection of the vehicle, in order to protect the driver, possibly one or more additional passengers, and/or certain equipment of the vehicle, can be further improved. The inventors of the present invention have found drawbacks in conventional solutions for impact protection of vehicles. For example, some conventional solutions do not provide a sufficient impact protection. Some conventional impact protection structures do not provide a sufficient impact protection while still having a sufficiently low weight.

An object of embodiments of the invention is to provide a solution which mitigates or solves drawbacks and problems of conventional solutions.

The above and further objects are solved by the subject matter of the independent claim. Further advantageous embodiments of the invention can be found in the dependent claims.

According to a first aspect of the invention, the above mentioned and other objects are achieved with a vehicle structure for impact protection, wherein the vehicle structure is attachable to a main body of a vehicle having a front end and a rear end, wherein the vehicle structure comprises a plurality of sections having a longitudinal extension extending in a longitudinal direction, and a front cover comprising a base, wherein the section of the plurality of sections forms one or more longitudinal compartments, wherein the sections of the plurality of sections are arranged beside one another so as to form a cellular structure, wherein the base of the front cover is configured to be positioned between the front end of the vehicle and the plurality of sections, and wherein the front cover covers the plurality of sections and is configured to distribute impact energy to the plurality of sections.

An advantage of the vehicle structure according to the first aspect is that an improved impact protection is provided, whereby the driver, possibly one or more additional passengers, the vehicle itself and/or certain equipment of the vehicle is/are efficiently protected. For example, the equipment to be protected may be one or more energy storage units, such as one or more electric battery units and/or one or more fuel cells. For example, the equipment to be protected may be any other electrical equipment. The energy storage unit may be configured for the propulsion of the vehicle.

An advantage of the vehicle structure according to the first aspect is that a low-weight impact protection structure is provided which still provides a sufficiently strong impact protection. An advantage of the vehicle structure according to the first aspect is that an advantageous deformation of the impact protection structure, or of the vehicle structure, for absorbing impacts or impact energy is provided while maintaining or improving the rigidity and reinforcement of the impact protection structure in order to prevent or counteract penetration by external objects upon a collision. By means of the innovative plurality of sections and front cover, the weight and thus the cost of the impact protection structure, or of the vehicle structure, can be reduced while still maintaining or even improving the rigidity and reinforcement of the impact protection structure. By means of the innovative plurality of sections and front cover, the performance of the impact protection structure, or vehicle structure, in collisions is improved, for example because the vehicle structure can be deformed in a more controlled and more predicted manner in relation to conventional solutions. By means of the innovative front cover, energy of an impact, such as of a front impact, is efficiently distributed to all sections of the plurality of sections, whereby an advantageous deformation of the plurality of sections and an efficient energy absorption of energy of the impact are provided. An advantage of the vehicle structure according to the first aspect is that damage on the vehicle and on vehicle equipment is prevented or mitigated. For example, an advantage of the vehicle structure according to the first aspect is that bending or buckling of the main body of the vehicle, such as the chassis, is prevented or mitigated.

It is to be understood that the plurality of sections comprises two or more sections. For some embodiments, the front cover may be configured to distribute front impact energy, which results from a front impact, to the plurality of sections.

According to an advantageous embodiment of the vehicle structure according to the first aspect, the vehicle structure is attachable to a main body of a vehicle comprising wheels and a cabin at least for a driver of the vehicle, wherein the plurality of sections is configured to be positioned below the cabin when the wheels of the vehicle rest on the ground. An advantage of this embodiment is that the impact protection of equipment positioned below the cabin and of the driver in the cabin is further improved. An advantage of this embodiment is that the safety of the driver, and/or of the passenger, in the cabin is further enhanced. However, for some embodiments, the vehicle structure is attachable to a main body of a vehicle without any cabin, for example to a main body of a self-driving vehicle, or of an autonomous vehicle.

According to a further advantageous embodiment of the vehicle structure according to the first aspect, the vehicle structure is attachable to a main body of a vehicle comprising wheels and a cabin at least for a driver of the vehicle,
wherein the front cover is configured to be positioned below the cabin when the wheels of the vehicle rest on the ground.

An advantage of this embodiment is that the impact protection of equipment positioned below the cabin and of the driver in the cabin is further improved. An advantage of this embodiment is that the safety of the driver, and/or of the passenger, in the cabin is further enhanced.

According to another advantageous embodiment of the vehicle structure according to the first aspect, the vehicle structure is attachable to a main body comprising a main frame,
wherein the plurality of sections is configured to be positioned between the cabin and at least one portion of the main frame.

An advantage of this embodiment is that the impact protection of equipment positioned between the cabin and the at least one portion of the main frame is further improved. An advantage of this embodiment is that the safety of the driver, and/or of the passenger, in the cabin is further enhanced.

According to yet another advantageous embodiment of the vehicle structure according to the first aspect, the vehicle structure is attachable to a main body comprising a main frame,
wherein the front cover is configured to be positioned between the cabin and at least one portion of the main frame.

An advantage of this embodiment is that the impact protection of equipment positioned between the cabin and the at least one portion of the main frame is further improved.
An advantage of this embodiment is that the safety of the driver, and/or of the passenger, in the cabin is further enhanced.

According to still another advantageous embodiment of the vehicle structure according to the first aspect, the vehicle structure is attachable to a main body of a vehicle in the form of one of the group of:
a truck;
a tractor vehicle;
a bus; and
a heavy vehicle.

The innovative vehicle structure is especially efficient for impact protection with regard to trucks, tractor vehicles, buses and heavy vehicles. However, for other embodiments, the innovative vehicle structure may be applied to cars, or any other vehicle.

According to an advantageous embodiment of the vehicle structure according to the first aspect, the vehicle structure is attachable to a main body comprising a compartment for holding one or more energy storage units, wherein the plurality of sections is configured to be positioned between the front end of the vehicle and the compartment for holding the one or more energy storage units. An advantage of this embodiment is that an efficient impact protection of the one or more energy storage units held in the compartment for holding one or more energy storage units is provided. For some embodiments, the energy storage unit may comprise one or more of the group of: an electric battery unit; and a fuel cell. The electric battery unit may be described to comprise one or more of electric battery cells. The energy storage unit may be configured for the propulsion of the vehicle. For some embodiments, it may be described that the plurality of sections is configured to be positioned between one or more energy storage units and the front end of the vehicle, wherein the one or more energy storage units may, for example, be held in a compartment for holding one or more energy storage units.

According to a further advantageous embodiment of the vehicle structure according to the first aspect, the vehicle structure is attachable to a main body comprising a compartment for holding one or more energy storage units,
wherein the plurality of sections is configured to be positioned between the base of the front cover and the compartment for holding one or more energy storage units.

An advantage of this embodiment is that the impact protection of the one or more energy storage units held in the compartment for holding one or more energy storage units is further improved.

According to another advantageous embodiment of the vehicle structure according to the first aspect, the plurality of sections is configured to be positioned such that the longitudinal extensions of the plurality of sections extend in a longitudinal direction from the rear end of the vehicle to the front end of the vehicle. In this regard, it is to be understood that it is the longitudinal direction that extends from the rear end of the vehicle to the front end of the vehicle. An advantage of this embodiment is that the impact protection is further improved. By arranging the sections of the plurality of sections in this manner, the deformation of the impact protection structure, or of the vehicle structure, for absorbing impacts or impact energy is made even more advantageous while maintaining or improving the rigidity and reinforcement of the impact protection structure in order to prevent or counteract penetration by external objects upon a collision. For alternative embodiments, the plurality of sections may be configured to be positioned such that the longitudinal extensions of the plurality of sections extend in a transverse direction transverse to a longitudinal direction from the rear end of the vehicle to the front end of the vehicle.

According to yet another advantageous embodiment of the vehicle structure according to the first aspect, the sections of the plurality of sections are detachable in relation to one another. An advantage of this embodiment is that a modular concept is provided, which allows the number of sections to be easily adapted to the vehicle to which the vehicle structure is applied. By means of this embodiment, the deformation of the vehicle structure and of the plurality of sections upon an impact can be tailored and controlled in an efficient manner, whereby the overall impact protection and performance of the vehicle structure can be tailored in an efficient manner and adapted to the circumstances and the vehicle at hand. An advantage of this embodiment is that the impact protection is further improved. For alternative embodiments, the sections of the plurality of sections may be integrally formed with one another. The fact that the sections of the plurality of sections are integrally formed with one another implies, or means, that the sections of the plurality of sections are formed into a single piece and/or are formed from a single piece. The sections of the plurality of sections may be attached to one another, or held together, in other manners.

According to still another advantageous embodiment of the vehicle structure according to the first aspect, the plurality of sections is configured to absorb impact energy while deforming as a result of an impact. An advantage of this embodiment is that an efficient impact protection is provided.

According to an advantageous embodiment of the vehicle structure according to the first aspect, the section of the plurality of sections comprises one or more tubular members having a longitudinal extension extending in the longitudinal direction,
  wherein the tubular member forms one or more longitudinal compartments of the longitudinal compartments, and
  wherein the tubular members of the plurality of sections are arranged beside one another so as to form the cellular structure.

An advantage of this embodiment is that the impact protection is further improved. An advantage of this embodiment is that a low-weight impact protection structure is provided which still provides a sufficiently strong impact protection. An advantage of this embodiment is that an advantageous deformation of the impact protection structure, or of the vehicle structure, for absorbing impacts or impact energy is provided while maintaining or improving the rigidity and reinforcement of the impact protection structure in order to prevent or counteract penetration by external objects upon a collision.

According to a further advantageous embodiment of the vehicle structure according to the first aspect, the plurality of sections is configured to be positioned such that the longitudinal extensions of the tubular members extend in a longitudinal direction from the rear end of the vehicle to the front end of the vehicle. An advantage of this embodiment is that the impact protection is further improved. By arranging the tubular members in this manner, the deformation of the impact protection structure, or of the vehicle structure, for absorbing impacts, or impact energy, is made even more advantageous while maintaining or improving the rigidity and reinforcement of the impact protection structure in order to prevent or counteract penetration upon a collision. For alternative embodiments, the plurality of sections may be configured to be positioned such that the longitudinal extensions of the tubular members extend in a transverse direction transverse to a longitudinal direction from the rear end of the vehicle to the front end of the vehicle.

According to another advantageous embodiment of the vehicle structure according to the first aspect, the tubular member comprises one or more longitudinal walls having a longitudinal extension extending in the longitudinal direction, wherein the one or more longitudinal walls forms/form the one or more longitudinal compartments of the tubular member. An advantage of this embodiment is that the impact protection is further improved.

According to yet another advantageous embodiment of the vehicle structure according to the first aspect, the plurality of sections is configured to absorb impact energy while the tubular members deform as a result of an impact. An advantage of this embodiment is that an efficient impact protection is provided.

According to still another advantageous embodiment of the vehicle structure according to the first aspect, the longitudinal compartments are filled with one or more of the group of:
  a gas;
  a gas mixture; and
  air.

An advantage of this embodiment is that the impact protection is further improved. An advantage of this embodiment is that a low-weight impact protection structure is provided which still provides a sufficiently strong impact protection. An advantage of this embodiment is that an advantageous deformation of the impact protection structure, or of the vehicle structure, for absorbing impacts, or impact energy, is provided while maintaining or improving the rigidity and reinforcement of the impact protection structure in order to prevent or counteract penetration upon a collision. This embodiment does not necessarily imply that the compartment is sealed off or pressurized. For alternative embodiments, the longitudinal compartments may be filled with a material, for example a material different from the material of the sections or of the tubular members.

According to an advantageous embodiment of the vehicle structure according to the first aspect, the vehicle structure comprises a rear cover comprising a base, wherein the rear cover covers the plurality of sections, and wherein the plurality of sections is positioned between the base of the front cover and the base of the rear cover. An advantage of this embodiment is that the impact protection is further improved. For example, by way of the innovative rear cover, the sections, when being detachable in relation to one another, are efficiently held in place, both before any impact and during an impact. Further, by way of the innovative rear cover, the attachment of the plurality of sections to the main body of the vehicle is facilitated.

According to a further advantageous embodiment of the vehicle structure according to the first aspect, one or more of the front and rear covers forms/form cover compartments, wherein the cover compartment holds one section of the plurality of sections. An advantage of this embodiment is that the impact protection is further improved. For example, by way of the cover compartments, the sections, when being detachable in relation to one another, are efficiently held in place, both before any impact and during an impact. Further, by way of the cover compartments, the attachment of the plurality of sections to the main body of the vehicle is facilitated.

According to another advantageous embodiment of the vehicle structure according to the first aspect, the vehicle structure comprises a stop attachable to the main body of the vehicle, wherein the stop is configured to be positioned between the plurality of sections and the rear end of the vehicle. An advantage of this embodiment is that after energy of the impact of the external objected has been absorbed by the plurality of sections and after the deformation of the plurality of sections, remaining energy of the impact is absorbed by the stop, and a penetrating external object, for example a beam of a leading vehicle, is efficiently stopped and prevented from further penetration into the vehicle, for example in the longitudinal direction. An advantage of this embodiment is that the impact protection is further improved. An advantage of this embodiment is that the stop may act as a stop for the plurality of sections, for example during an impact. An advantage of this embodiment is that the stop may hold the plurality of sections in position during an impact. For some embodiments, the stop may be configured to be positioned between the rear cover and the rear end of the vehicle.

According to still another advantageous embodiment of the vehicle structure according to the first aspect, the stop is configured to be positioned between the plurality of sections and a compartment for holding the one or more energy storage units. An advantage of this embodiment is that the impact protection of the one or more energy storage units held in the compartment for holding one or more energy storage units is further improved.

According to yet another advantageous embodiment of the vehicle structure according to the first aspect, the plurality of sections is positioned between the base of the front cover and the stop. An advantage of this embodiment is that the impact protection is further improved.

According to an advantageous embodiment of the vehicle structure according to the first aspect, the base of the rear cover is positioned between the plurality of sections and the stop. An advantage of this embodiment is that the impact protection is further improved.

According to a further advantageous embodiment of the vehicle structure according to the first aspect, the stop comprises a wall attachable to the main body of the vehicle. An advantage of this embodiment is that the impact protection is further improved.

According to another advantageous embodiment of the vehicle structure according to the first aspect, the vehicle structure comprises a base attachment attached to the stop and attachable to a main body of a vehicle comprising wheels, wherein the base attachment is configured to be positioned below the plurality of sections when the wheels of the vehicle rest on the ground. An advantage of this embodiment is that an efficient and strong attachment of the stop to the main body of the vehicle is provided, especially with regard to a front impact, or front impact energy. An advantage of this embodiment is that the impact protection is further improved.

According to yet another advantageous embodiment of the vehicle structure according to the first aspect, the base attachment is attachable to the main body of the vehicle at one or more positions between the front end of the vehicle and the plurality of sections. An advantage of this embodiment is that attachment of the stop to the main body of the vehicle is made even stronger and more efficient, especially with regard to a front impact, or front impact energy. An advantage of this embodiment is that the impact protection is further improved.

According to still another advantageous embodiment of the vehicle structure according to the first aspect, the base attachment comprises two legs,
  wherein the base attachment is configured to be attached to the main body of the vehicle such that the leg points in a direction toward the front end of the vehicle,
  wherein the leg comprises an end portion,
  wherein the end portions of the legs are spaced apart from one another such that the base attachment forms a space between the legs, and
  wherein the end portion of the leg is attachable to the main body of the vehicle.

An advantage of this embodiment is that the attachment of the stop to the main body of the vehicle is made even stronger and more efficient, especially with regard to a front impact, or front impact energy, while avoiding a bulkiness of the base attachment and thus leaving space for other equipment, for example in the space between the legs. An advantage of this embodiment is that the impact protection is further improved.

According to an advantageous embodiment of the vehicle structure according to the first aspect, the end portion of the leg is attachable to the main body of the vehicle at one or more positions between the front end of the vehicle and the plurality of sections. An advantage of this embodiment is that the attachment of the stop to the main body of the vehicle is made even stronger and more efficient, especially with regard to a front impact, or front impact energy. An advantage of this embodiment is that the impact protection is further improved.

According to a further advantageous embodiment of the vehicle structure according to the first aspect, the vehicle structure comprises two lateral attachments attached to the stop,
  wherein the stop is positioned between the two lateral attachments,
  wherein the lateral attachment has a longitudinal extension extending in a longitudinal direction, and
  wherein the lateral attachment is attachable to the main body of the vehicle such that the longitudinal extension of the lateral attachment extends in a longitudinal direction from the front end of the vehicle to the rear end of the vehicle.

An advantage of this embodiment is the attachment of the stop to the main body of the vehicle is made even stronger and more efficient, especially with regard to a front impact, or front impact energy. An advantage of this embodiment is that the impact protection is further improved.

According to another advantageous embodiment of the vehicle structure according to the first aspect, the lateral attachment is attachable to the main body of the vehicle such that the longitudinal extension of the lateral attachment extends from the stop in a direction toward the rear end of the vehicle. An advantage of this embodiment is that the attachment of the stop to the main body of the vehicle is made even stronger and more efficient, especially with regard to a front impact, or front impact energy. An advantage of this embodiment is that the impact protection is further improved.

According to yet another advantageous embodiment of the vehicle structure according to the first aspect, the lateral attachment has a transverse extension,
  wherein the lateral attachment has a front end and a rear end,
  wherein the front end of the lateral attachment is attached to the stop and is positioned between the stop and the rear end of the lateral attachment, and
  wherein the transverse extension of the front end of the lateral attachment exceeds the transverse extension of the rear end of the lateral attachment.

An advantage of this embodiment is that the attachment of the stop to the main body of the vehicle is made even stronger and more efficient, especially with regard to a front impact, or front impact energy. An advantage of this embodiment is that the distribution of impact energy through the stop and from the stop to the main body of the vehicle, inter alia via the lateral attachments, can be controlled in an efficient manner. An advantage of this embodiment is that the impact protection is further improved.

According to still another advantageous embodiment of the vehicle structure according to the first aspect, wherein the stop comprises two curved corners,
  wherein the wall of the stop extends from one of the two curved corners to the other one of the two curved corners, and
  wherein one of the two curved corners adjoins one of the two lateral attachments while the other one of the two curved corners adjoins the other one of the two lateral attachments.

An advantage of this embodiment is that the attachment of the stop to the main body of the vehicle is made even stronger and more efficient, especially with regard to a front impact, or front impact energy. An advantage of this embodiment is that the impact protection is further improved. An advantage of this embodiment is that the distribution of impact energy through the stop can be controlled in an efficient manner. An advantage of this embodiment is that the stop is made less bulky while still being strong.

According to an advantageous embodiment of the vehicle structure according to the first aspect, the lateral attachments are attachable to the main body of the vehicle such that the compartment for holding one or more energy storage units is positioned between the two lateral attachments. An advantage of this embodiment is that the attachment of the stop to the main body of the vehicle is made even stronger and more efficient, especially with regard to a front impact, or front impact energy. An advantage of this embodiment is that the impact protection is further improved. An advantage of this embodiment is that the impact protection of the one or more energy storage units is further improved.

According to a further advantageous embodiment of the vehicle structure according to the first aspect, the vehicle structure comprises one or more reinforcement elements for reinforcing one or more longitudinal beams of a main frame of the main body of the vehicle,
wherein the reinforcement element has a longitudinal extension extending in a longitudinal direction,
wherein the reinforcement element is attachable to the longitudinal beam so as to reinforce the longitudinal beam, and
wherein the lateral attachment is attached to the reinforcement element.

An advantage of this embodiment is that the attachment of the stop to the main body of the vehicle is made even stronger and more efficient, especially with regard to a front impact, or front impact energy. An advantage of this embodiment is that the impact protection is further improved. An advantage of this embodiment is that the distribution of impact energy through the stop and from the stop to the main frame of the main body of the vehicle can be controlled in an efficient manner. An advantage of this embodiment is that after energy of the impact of the external objected has been absorbed by the plurality of sections, after the deformation of the plurality of sections, and after energy of the impact has been absorbed by the stop, remaining energy of the impact is efficiently distributed by the reinforcement element to the longitudinal beam and further to other parts of the main body or main frame, for example to other less critical parts of the main frame. An advantage of this embodiment is that the one or more reinforcement elements reinforce the one or more longitudinal beams of the main frame and thus prevents, or counteracts, buckling and bending of the longitudinal beam of the main frame during an impact and/or collision. An advantage of this embodiment is that the compartment for holding one or more energy storage units can be efficiently protected and maintained during a collision, whereby the one or more energy storage units held in the compartment is/are efficiently protected upon an impact. For some embodiments, one or more of the stop, base attachment, lateral attachment and reinforcement element is/are configured prevent, or counteract, buckling and bending of the main frame during an impact and/or collision and thus ensures/ensure an efficient deformation and energy absorption of the plurality of sections.

According to another advantageous embodiment of the vehicle structure according to the first aspect, the reinforcement element is attachable to the longitudinal beam such that the longitudinal extension of the reinforcement element extends in a longitudinal direction from the rear end of the vehicle to the front end of the vehicle. An advantage of this embodiment is that the impact protection is further improved, especially with regard to a front impact, or front impact energy.

According to still another advantageous embodiment of the vehicle structure according to the first aspect, the reinforcement element is attachable to a longitudinal beam having a longitudinal extension extending in a longitudinal direction from the rear end of the vehicle to the front end of the vehicle. An advantage of this embodiment is that the impact protection is further improved, especially with regard to a front impact, or front impact energy.

According to yet another advantageous embodiment of the vehicle structure according to the first aspect, the plurality of sections is made of a material comprising or consisting of a metal or a metal alloy, for example a material comprising or consisting of aluminum. An advantage of this embodiment is that the impact protection is further improved. An advantage of this embodiment is that the deformation of the impact protection structure, or of the vehicle structure, for absorbing impacts, or impact energy, is further improved while maintaining or improving the rigidity and reinforcement of the impact protection structure in order to prevent or counteract penetration upon a collision. However, materials different from a material comprising or consisting of a metal or a metal alloy are possible, such as a material comprising or consisting of a polymer or a polymer composite, which may be reinforced in various manners, for example by fibers.

According to an advantageous embodiment of the vehicle structure according to the first aspect, the section of the plurality of sections is extruded. This is an efficient manner to produce the sections the plurality of sections. However, the section of the plurality of sections may be produced in other ways, for example by way of casting.

According to a further advantageous embodiment of the vehicle structure according to the first aspect, the longitudinal compartment extends from a first end of the cellular structure to a second end of the cellular structure, wherein the front cover is arranged at the first end of the cellular structure and covers the first end of the cellular structure. An advantage of this embodiment is that the impact protection is further improved.

According to a second aspect of the invention, the above mentioned and other objects are achieved with a vehicle having a front end, a rear end and a main body between the front and rear ends, wherein the vehicle comprises a vehicle structure according to any one of the embodiments disclosed above or below.

Advantages of the vehicle according to the second aspect and its embodiments correspond to the above- or below-mentioned advantages of the vehicle structure according to the first aspect and its embodiments.

According to a further advantageous embodiment of the vehicle according to the second aspect, the main body comprises, or forms, a compartment for holding one or more energy storage units, wherein the plurality of sections is positioned between the front end of the vehicle and the compartment for holding the one or more energy storage units.

According to another advantageous embodiment of the vehicle according to the second aspect, the vehicle comprises one or more energy storage units held in the compartment for holding the one or more energy storage units. For some embodiments, the energy storage unit may comprise one or more of the group of: an electric battery unit; and a fuel cell. The electric battery unit may be described to comprise one or more of electric battery cells. The energy storage unit may be configured for the propulsion of the vehicle.

According to yet another advantageous embodiment of the vehicle according to the second aspect, the main body comprises a main frame, for example a chassis, wherein the plurality of sections is positioned between the cabin and at least one portion of the main frame.

For some embodiments, the main frame may comprise one or more longitudinal beams.

According to still another advantageous embodiment of the vehicle according to the second aspect, the vehicle comprises
wheels, and
a cabin at least for a driver of the vehicle,
wherein the plurality of sections is positioned below the cabin when the wheels of the vehicle rest on the ground. For some embodiments, the vehicle may be described as a wheeled vehicle, i.e. a vehicle having wheels. For alternative embodiments, the vehicle may be without any cabin. For example, the vehicle may be a self-driving vehicle, or an autonomous vehicle.

For example, the vehicle may be in the form of one of the group of: a truck; a tractor vehicle; a bus; a heavy vehicle; and a car. The tractor vehicle, and/or the truck, may, or may be configured to, haul, or pull, a trailer. However, other types of vehicles are possible. The vehicle may be referred to as a motor vehicle. The vehicle may be an electric vehicle, EV, for example a hybrid vehicle or a hybrid electric vehicle, HEV, or a battery electric vehicle, BEV. Thus, a hybrid electric vehicle, HEV, and a battery electric vehicle, BEV, are versions, or examples, of an electric vehicle, EV. The EV may comprise one or more electric machines. For some embodiments, the vehicle may comprise a combustion engine.

The vehicle may comprise a powertrain for the propulsion of the vehicle. The powertrain may be configured in accordance with any one of the embodiments disclosed above or below. The powertrain of the vehicle may comprise one or more of the group of: an energy storage unit; an electric battery unit; an electric battery cell; an electric battery pack; a gas container; and a fuel cell.

The above-mentioned features and embodiments of the vehicle structure and the vehicle, respectively, may be combined in various possible ways providing further advantageous embodiments.

Further advantageous embodiments of the vehicle structure and the vehicle according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

With reference to FIGS. 2 to 21, aspects of embodiments of the vehicle structure 100 for impact protection according to the first aspect of the invention are schematically illustrated.

Figure 1:
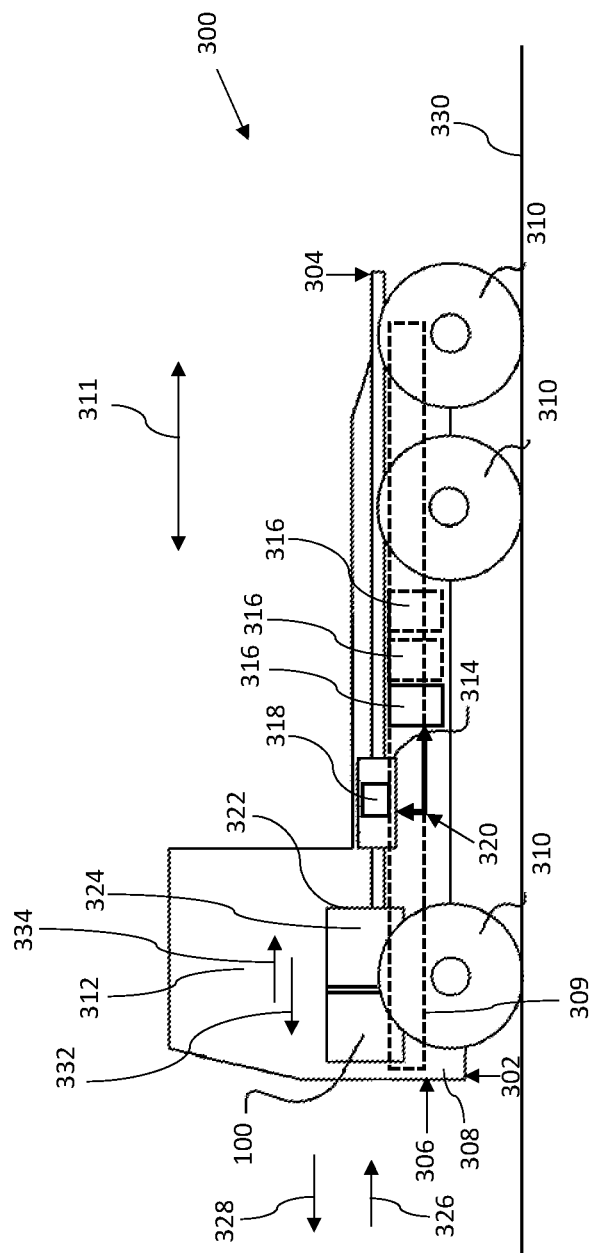
FIG. 1 is a schematic side view of an embodiment of the vehicle according to the second aspect of the invention illustrating a position of an embodiment of the vehicle structure according to the first aspect of the invention.

With reference to FIG. 1, aspects of embodiments of the vehicle 300 according to the second aspect of the invention are schematically illustrated. Especially, FIG. 1 schematically illustrates a possible position of the vehicle structure 100 when applied to a vehicle 300. In FIG. 1, the vehicle 300 is schematically illustrated as a tractor vehicle. However, for other embodiments, the vehicle 300 may be in the form of any one of the group of: a truck; a tractor vehicle; a bus; and a heavy vehicle. For some embodiments, the vehicle 300 may even be in the form a car. However, other types of vehicles are also possible, for example vessels, such as watercrafts. The vehicle 300 may be an electric vehicle, EV, for example a hybrid vehicle or a hybrid electric vehicle, HEV, or a battery electric vehicle, BEV. In FIG. 1, the vehicle 300 is schematically illustrated as a BEV, i.e. without any combustion engine.

With reference to FIG. 1, the vehicle 300 has a front end 302 and a rear end 304. The vehicle 300 includes a main body 306, which, for example, may comprise a chassis. It may be described that the main body 306 extends from the front end 302 to the rear end 304, and/or that the main body 306 extends between the front and rear ends 302, 304. The main body 306 may include a main frame 308, such as a chassis. One or more of the vehicle 300, main body 304 and main frame 308 may comprise one or more longitudinal beams 309, for example two or more longitudinal beams 309, schematically illustrated by dotted lines in FIG. 1. The longitudinal beam 309 may extend in a longitudinal direction 311, for example in the longitudinal direction 311 of the vehicle 300. The longitudinal direction 311 may extend from the rear end 304 of the vehicle 300 to the front end 302 of the vehicle 300. The vehicle 300 includes a vehicle structure 100 according to any one of the embodiments disclosed above or below.

With reference to FIG. 1, the vehicle 300 may be a wheeled vehicle. Thus, the vehicle 300 may include wheels 310. Only the wheels 310 on the left-hand side of the vehicle 300 are visible in FIG. 1. It is to be understood that the vehicle 300 may have fewer or more wheels than what is shown in FIG. 1. The vehicle 300 may include a cabin 312 at least for a driver of the vehicle, and optionally for one or more additional passengers.

The vehicle 300 may have a longitudinal extension extending in a longitudinal direction 311 of the vehicle 300. The longitudinal direction 311 of the vehicle 300 may be parallel to a flat horizontal support surface 330 when the vehicle 300 is positioned in an upright use position on the flat horizontal support surface 330. The wheels 310 of the vehicle 300 abut against the flat horizontal support surface 330 when the vehicle 300 is positioned in the upright use position thereon. Moreover, the longitudinal direction 311 of the vehicle 300 may be parallel to a forward and a reverse moving direction of the vehicle 300. The vehicle 300 may have a transverse extension extending in a lateral, or transverse, direction. The lateral direction of the vehicle 300 is perpendicular to the longitudinal direction 311 of the vehicle 300 and is parallel to a flat horizontal support surface 330 when the vehicle 300 is positioned in an upright use position on the flat horizontal support surface 330.

With reference to FIG. 1, the vehicle 300 may comprise a powertrain 314, for example configured for one of an EV, HEV and BEV. The vehicle 300 may be configured to hold or carry, or may include, one or more electric battery packs 316 for the propulsion of the vehicle 300. For the illustrated vehicle 300, the vehicle 300 itself carries the one or more electric battery packs 316. However, for other embodiments, the trailer hauled, or pulled, by the vehicle 300 may carry the one or more electric battery packs 316. The vehicle 300 may include one more electric machines 318 for the propulsion of the vehicle 300. It may be defined that the powertrain 314 and/or the one or more electric machines 318 is/are configured to propel, or drive, the vehicle 300. It may be defined that the powertrain 314 includes the one or more electric battery packs 316.

With reference to FIG. 1, the vehicle 300 may include a vehicle electrical system 320. The vehicle electrical system 320 is configured to electrically connect the one or more electric battery packs 316 to the powertrain 314 of the vehicle 300. The vehicle electrical system 320 may be configured to electrically connect the one or more electric battery packs 316 to the one or more electric machines 318 of the vehicle 300. It may be defined that the vehicle electrical system 320 is configured to transfer the electric power, or the electric current, for example between the one or more electric machines 318 (and/or the powertrain 314) and the one or more electric battery packs 316. For some embodiments, the vehicle electrical system 320 may be a vehicle high voltage system. It may be defined that the vehicle electrical system 320 is configured for direct current. It may be defined that the vehicle electrical system 320 is configured for a high voltage, such as a voltage above 60 V, for example above 400 V, or above 450 V, such as above 650 V. For example, the vehicle electrical system 320 may be configured for a voltage up to 1500 V and/or for a voltage above 1500 V. The electric power, or the electric current, for example the direct current, of the vehicle electrical system 320 may be transferred at a high voltage, for example at one or more of the voltages levels mentioned above. The vehicle electrical system 320 may be configured to transfer the electric power, or the electric current, at a high voltage, for example at one or more of the voltages levels mentioned above.

With reference to FIG. 1, it is to be understood that the vehicle 300 may include further unites, components, such as electrical and/or mechanical components, and other devices required for a vehicle 300, such as for an EV, HEV or BEV.

With reference to FIG. 1, for some embodiments, the main body 306 may include a compartment 322 for holding one or more energy storage units 324. For some embodiments, the vehicle 300 comprises one or more energy storage units 324, for example held in the compartment 322 for holding one or more energy storage units 324. The energy storage unit 324 may comprise one or more of the group of: an electric battery unit; a gas container; and a fuel cell. The electric battery unit may be described to comprise one or more of electric battery cells. The energy storage unit 324 may be configured for the propulsion of the vehicle 300. However, other energy storage units are possible. The energy storage unit 324 may be described as an electrical energy storage unit, a chemical energy storage unit, and/or an electrochemical energy storage unit. As stated above, the vehicle 300 as illustrated in FIG. 1 does not include a combustion engine. The vehicle structure 100 and possibly the one or more energy storage units 324 may be described to have taken the place, or position, of the absent combustion engine. For some embodiments, the energy storage unit 324 may be described as a supplementary energy storage for the propulsion of the vehicle 300 in addition to the one or more electric battery packs 316. By way of the one or more energy storage units 324, the driving range of the vehicle 300, without any intermediate charging session, may be increased.

With reference to FIGS. 1 to 10, the vehicle structure 100 is attachable, or attached, to a main body 306 of a vehicle 300 having a front end 302 and a rear end 304, for example by way of holes and/or through-holes and attachment elements, such as screws or bolts, received in the through-holes and/or holes. The bolt may engage a nut for attachment. It is to be understood that any one of the screw, bolt and nut may have one or more threads. The vehicle structure 100 includes a plurality of sections 102a-i. The section 102a-i of the plurality of sections 102a-i has a longitudinal extension 104 extending in a longitudinal direction 311. The vehicle structure 100 includes a front cover 106, the front cover 106 comprising a base 108. The section 102a-i of the plurality of sections 102a-i forms one or more longitudinal compartments 110. For some embodiments, the longitudinal compartment 110 may be referred to as a longitudinal room, a longitudinal cavity, a longitudinal pocket, a longitudinal cell and/or a longitudinal space. The sections 102a-i of the plurality of sections 102a-i are arranged beside one another, or side-by-side, for example in, or in relation to, the longitudinal direction 311, so as to form a cellular structure 112. The base 108 of the front cover 106 is positioned, or configured to be positioned, between the front end 302 of the vehicle 300 and the plurality of sections 102a-i. The front cover 106 covers the plurality of sections 102a-i. For example, it may be defined that the front cover 106 covers the plurality of sections 102a-i when viewed from the front end 302 of the vehicle 300 toward the rear end 304 of the vehicle 300. The front cover 106 is configured to distribute impact energy to the plurality of sections 102a-i. For example, it may be described that the front cover 106 is configured to distribute front impact energy to the plurality of sections 102a-i, wherein the front cover 106 may be subjected to a front impact energy, or force, in a direction 326 toward the vehicle 300, for example in a direction 326 toward the rear end 304 of the vehicle 300 via the front end 302 of the vehicle 300, and wherein the impact energy may be described to be the result of an impact. With reference to FIG. 1, for example, the impact, or collision, may occur when the vehicle 300 travels in a forward direction 328 and crashes its front end 302 into the rear end of a leading vehicle, or into the rear end of a trailer of the leading vehicle. An example of such an impact, or collision, will be described in further detail hereinbelow in connection with FIGS. 22A-C and 23A-C. With reference to FIGS. 2 to 10, the plurality of sections 102a-i may be described to be configured to absorb impact energy while deforming as a result of an impact. For some embodiments, it may be defined that the plurality of sections 102a-i is adjacent to, and/or abuts against, one or more of the front cover 106 and base 108 of the front cover 106. For some embodiments, it may be defined that the base 108 of the front cover 106 is configured to distribute impact energy to the plurality of sections 102a-i.

Figure 10:
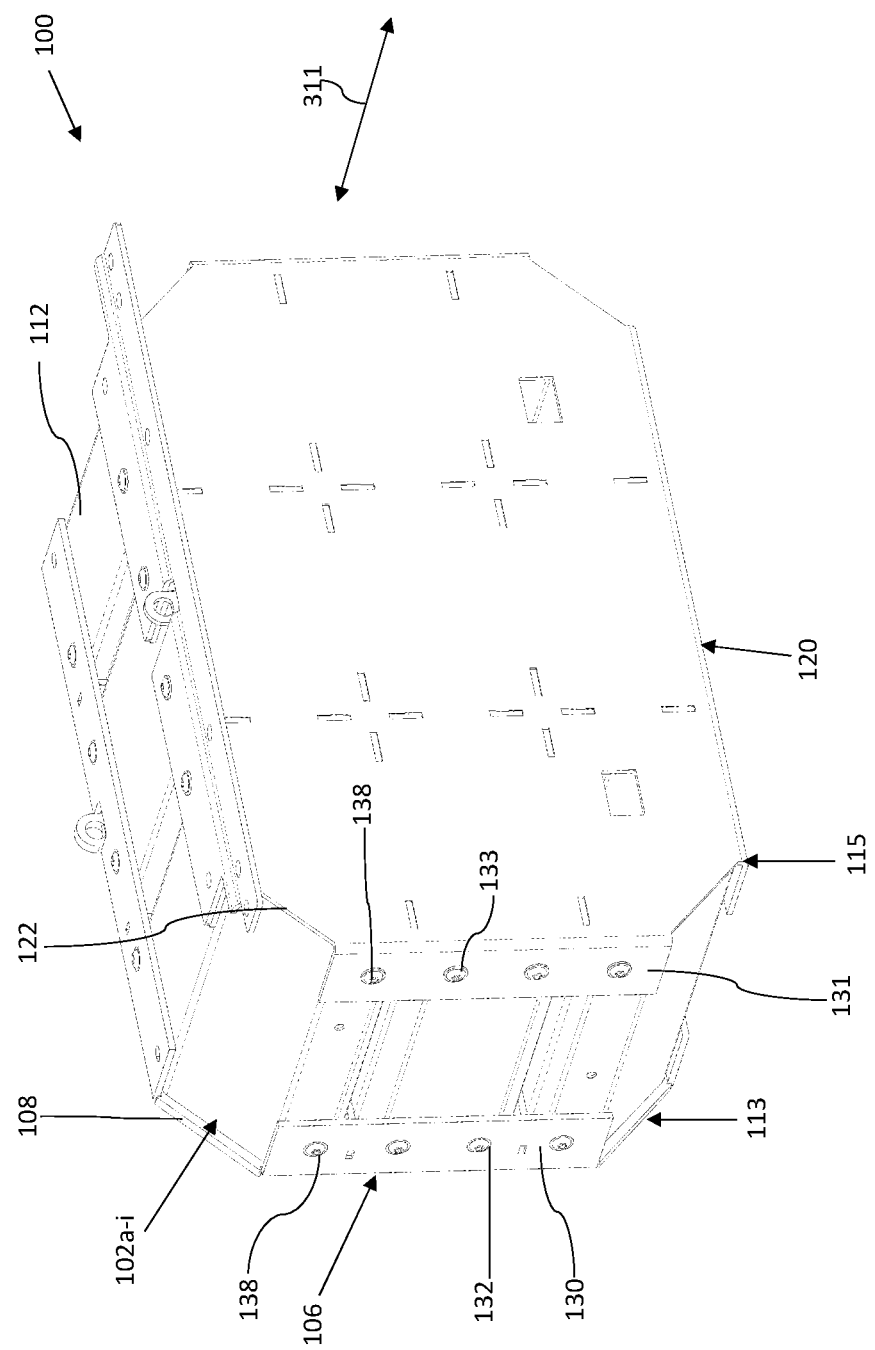
FIG. 10 is a schematic perspective rear view of the plurality of sections and the front and rear covers of the vehicle structure of FIG. 2.
Figure 11:
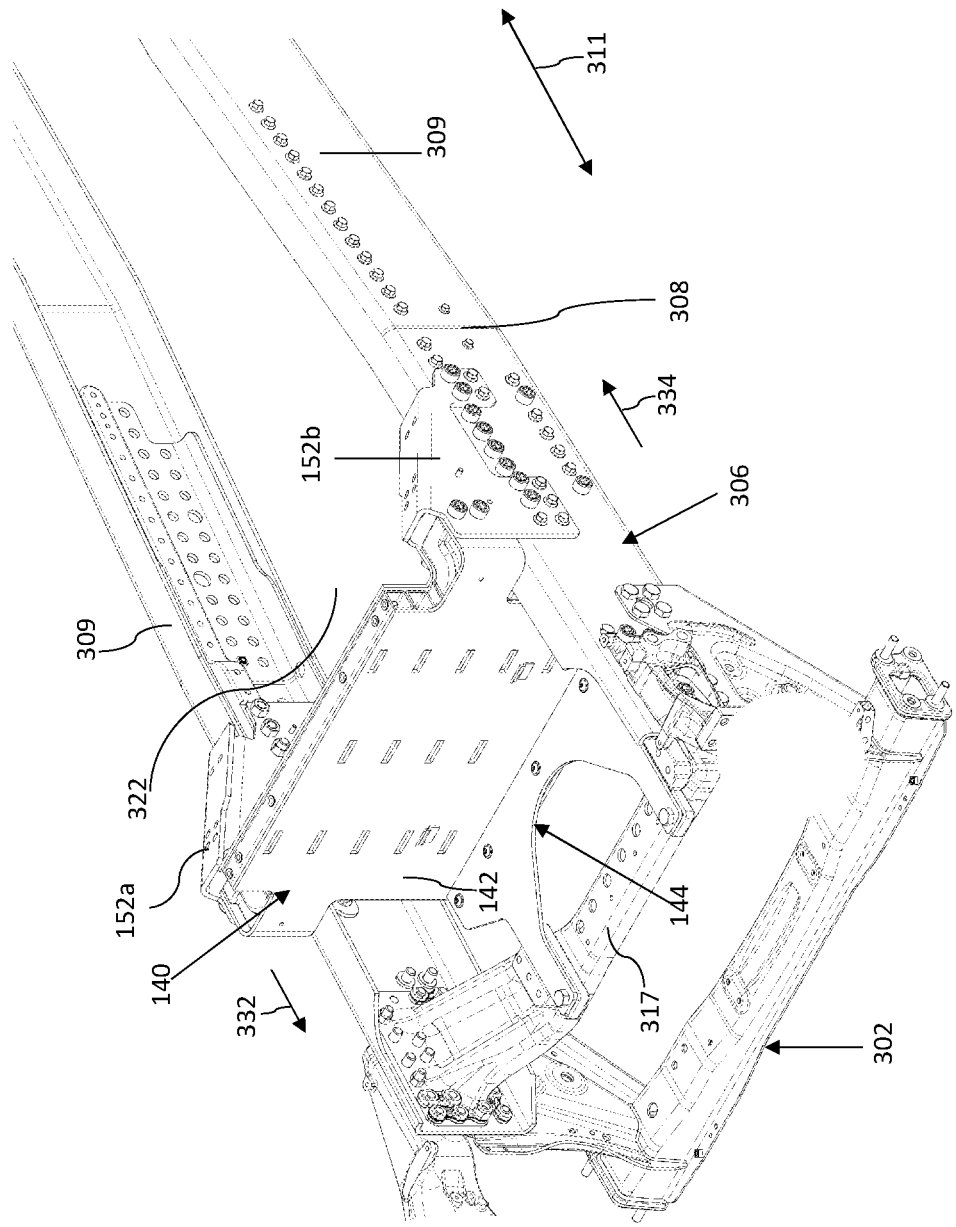
FIG. 11 is a schematic perspective front view of an embodiment of the stop of the vehicle structure of FIG. 2, wherein the plurality of sections and the front and rear covers are excluded for illustrative purposes.

With reference to FIGS. 1 and 10, for some embodiments, the plurality of sections 102a-i and/or the one or more energy storage units 324 may be positioned in a space previously dedicated for a combustion engine, the combustion engine now being absent. For some embodiments, the one or more energy storage units 324 may be positioned in the space for the absent combustion engine while the plurality of sections 102a-i may be positioned between the front end 302 of the vehicle 300 and the space for the absent combustion engine.

Figure 2:
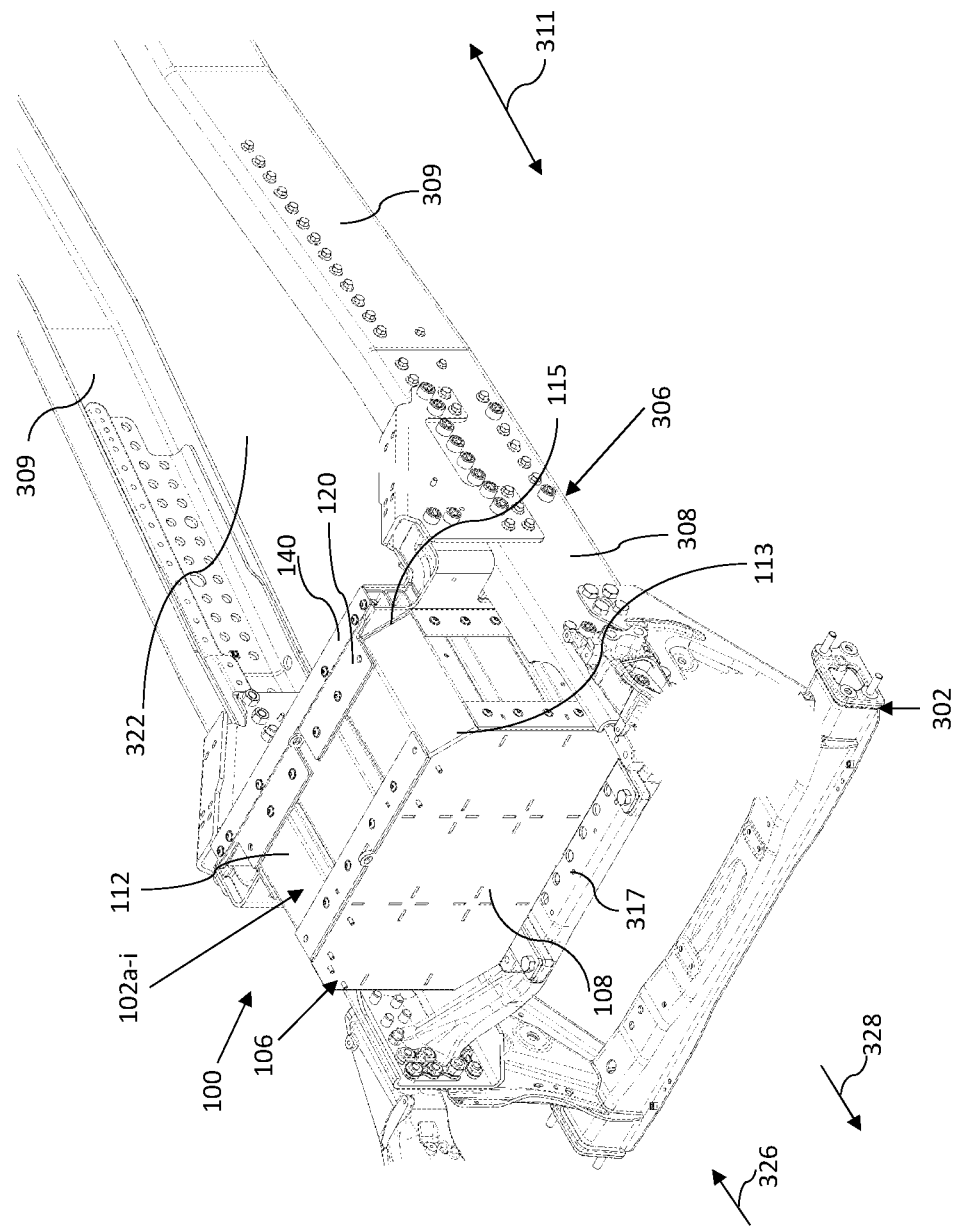
FIG. 2 is a schematic perspective front view of an embodiment of the vehicle structure according to the first aspect of the invention.
Figure 3:
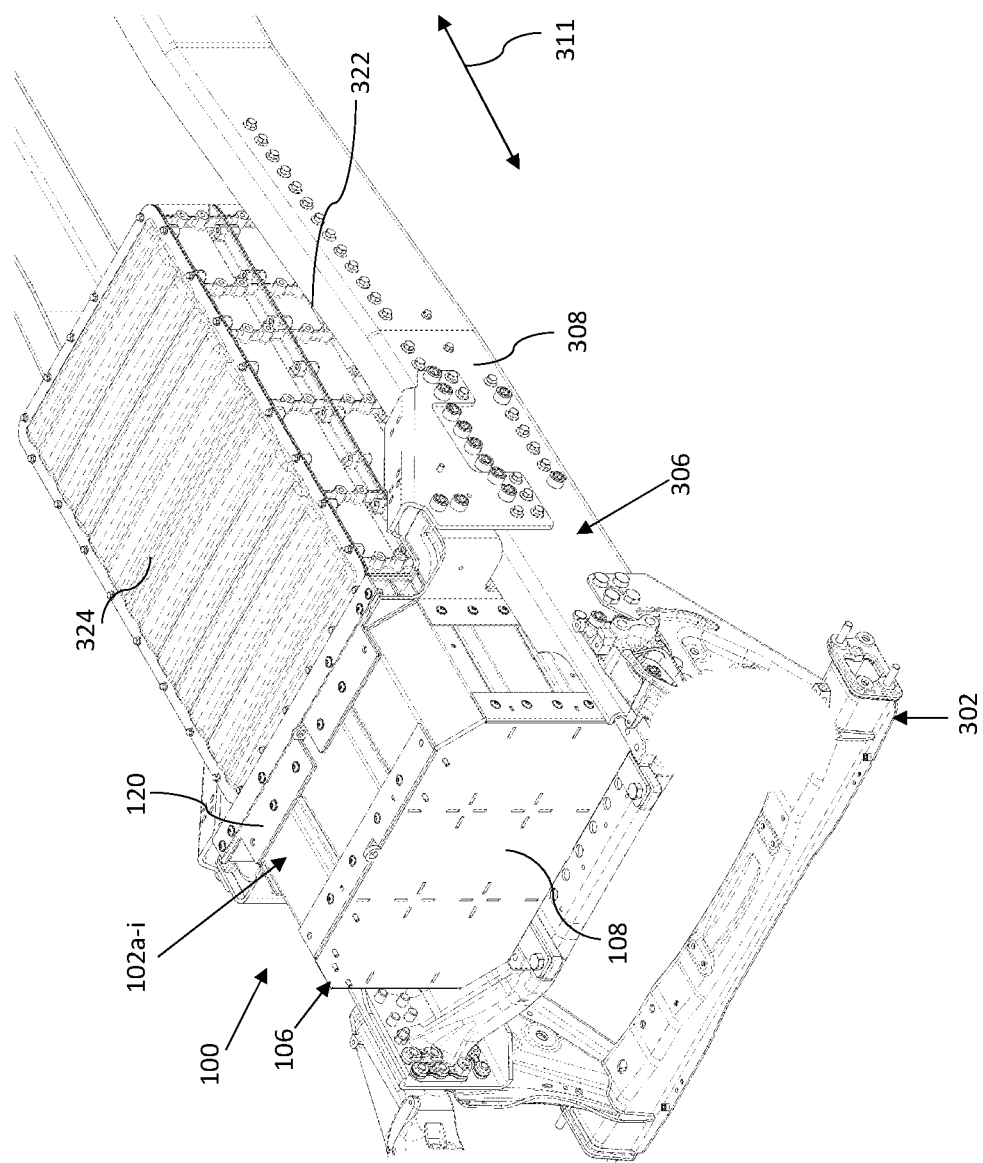
FIG. 3 is a schematic perspective front view of vehicle structure of FIG. 2 together with an energy storage unit.
Figure 4:
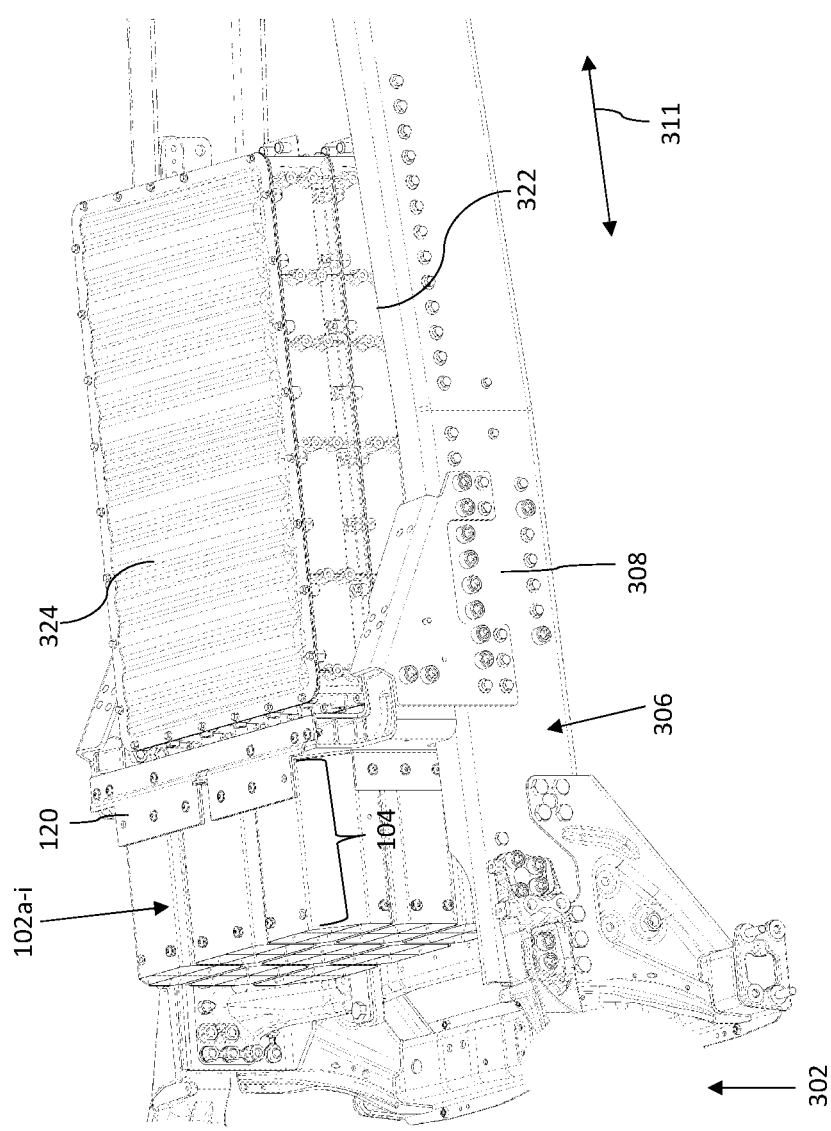
FIG. 4 is a schematic perspective side view of the vehicle structure of FIG. 2 together with the energy storage unit of FIG. 3, wherein the front cover is absent for illustrative purposes.
Figure 5:
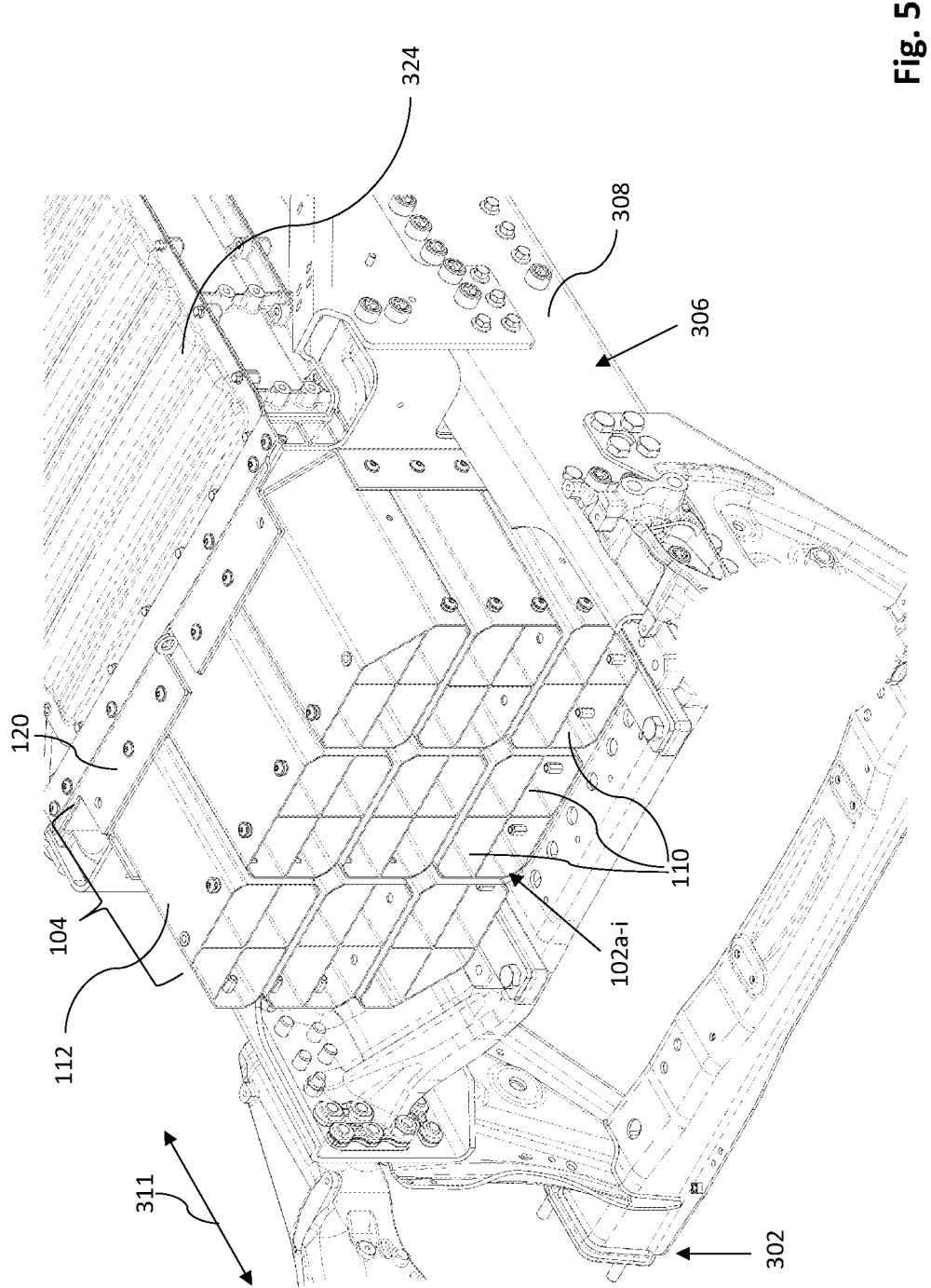
FIG. 5 is a schematic perspective front view of the plurality of sections of FIG. 4.
Figure 6:
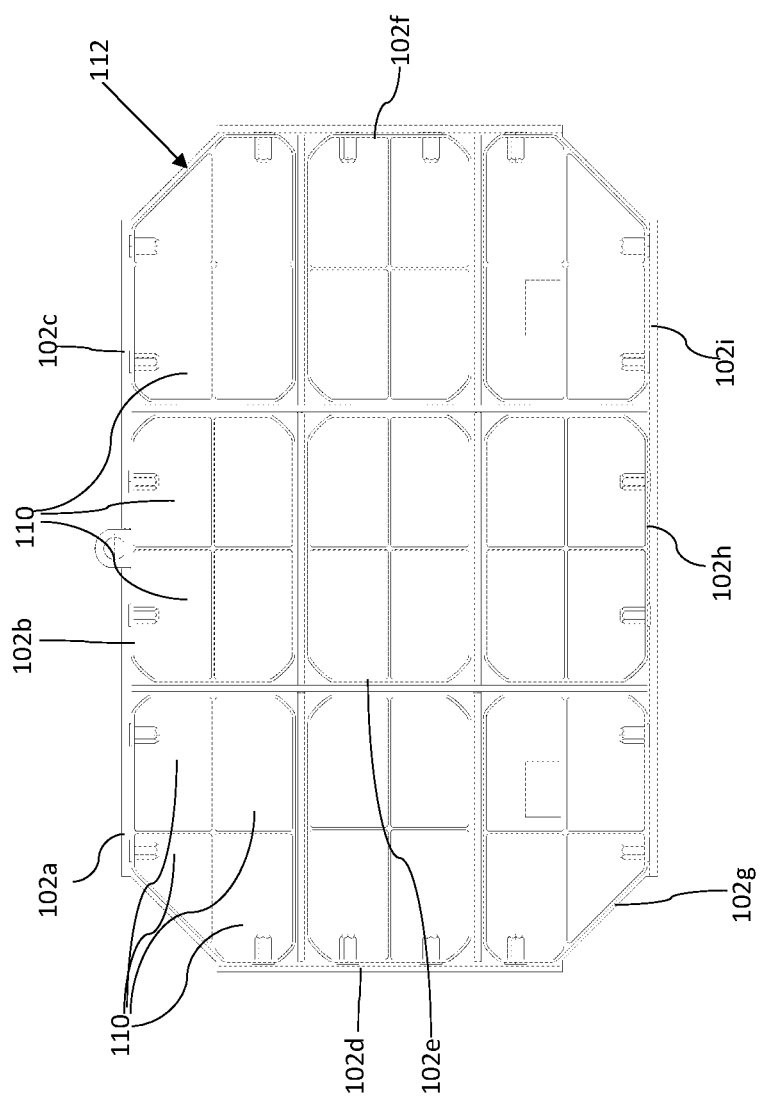
FIG. 6 is a schematic front view of the plurality of sections of FIG. 5.

With reference to FIGS. 2 and 10, for some embodiments, the cellular structure 112 may be described to have a first end 113 and a second end 115. The longitudinal compartment 110 may extend from the first end 113 of the cellular structure 112 to the second end 115 of the cellular structure 112. The front cover 106 may be arranged at the first end 113 of the cellular structure 112 and may cover the first end 113 of the cellular structure 112. The first end 113 of the cellular structure 112 may be positioned, or may be configured to be positioned, between the front end 302 of the vehicle 300 and the second end 115 of the cellular structure 112.

With reference to FIGS. 1 to 10, for some embodiments, the vehicle structure 100 is attachable, or attached, to a main body 306 of a vehicle 100 including wheels 310 and a cabin 312 at least for a driver of the vehicle 300. For some embodiments, the plurality of sections 102a-i is positioned, or configured to be positioned, below the cabin 312 when the wheels 310 of the vehicle rest on the ground 330. For some embodiments, the front cover 106 is positioned, or configured to be positioned, below the cabin 312 when the wheels 310 of the vehicle 100 rest on the ground 330. For some embodiments, the vehicle structure 100 is attachable, or attached, to a main body 306 including a main frame 308. For some embodiments, the plurality of sections 102a-i is positioned, or configured to be positioned, between the cabin 312 and at least one portion of the main frame 308. For some embodiments, the front cover 106 is positioned, or configured to be positioned, between the cabin 312 and at least one portion of the main frame 308. With reference to FIG. 1, for some embodiments, the vehicle structure 100 is attachable, or attached, to a main body 306 of a vehicle 300 in the form of one of the group of: a truck; a tractor vehicle; a bus; and a heavy vehicle. However, the vehicle structure 100 may also be attachable, or attached, to a main body 306 of any other vehicle.

With reference to FIGS. 1 to 10, for some embodiments, the vehicle structure 100 is attachable, or attached, to a main body 306 including a compartment 322 for holding one or more energy storage units 324, for example an energy storage unit 324 of any one of the sorts mentioned above. For some embodiments, the plurality of sections 102a-i is positioned, or configured to be positioned, between the front end 302 of the vehicle 300 and the compartment 322 for holding the one or more energy storage units 324. For some embodiments, it may be described that the plurality of sections 102a-i is positioned, or configured to be positioned, between the front end 302 of the vehicle 300 and one or more energy storage units 324, for example held in a compartment 322 for holding one or more energy storage units 324. For some embodiments, the plurality of sections 102a-i is positioned, or configured to be positioned, between the base 108 of the front cover 106 and the compartment 324 for holding one or more energy storage units. For some embodiments, it may be described that the plurality of sections 102a-i is positioned, or configured to be positioned, between the base 108 of the front cover 106 and one or more energy storage units 324, for example held in a compartment 322 for holding one or more energy storage units 324.

With reference to FIGS. 1 to 10, for some embodiments, it may be defined that the plurality of sections 102a-i is adjacent to the compartment 322 for holding one or more energy storage units 324 and/or adjacent to the one or more energy storage units 324 held in the compartment 322. For some embodiments, it may be defined that the plurality of sections 102a-i is configured to protect the one or more energy storage units 324, for example held in the compartment 322 for holding one or more energy storage units 324. For some embodiments, it may be defined that one or more of the front cover 106 and base 108 of the front cover 106 is/are adjacent to the front end 302 of the vehicle 300. For some embodiments, it may be defined that the compartment 322 for holding one or more energy storage units 324 is positioned below the cabin 312 of the vehicle 300.

With reference to FIGS. 2 to 10, the plurality of sections 102a-i may be positioned, or may be configured to be positioned, such that the longitudinal extensions 104 of the plurality of sections 102a-i extend in a longitudinal direction 311 from the rear end 304 of the vehicle 300 to the front end 302 of the vehicle 300. In this regard, it is to be understood that it is the longitudinal direction 311 that may extend from the rear end 304 of the vehicle 300 to the front end 302 of the vehicle 300. In the illustrated embodiments, the longitudinal direction 311 of the plurality of sections 102a-i is substantially parallel to the longitudinal direction 311 of the vehicle 300. It is to be understood that "substantially parallel" in this regard may encompass that the angle formed between said directions referred to is between zero and 12 degrees, for example between zero and 7 degrees.

For alternative embodiments, the plurality of sections 102a-i may be positioned, or may be configured to be positioned, such that the longitudinal extensions 104 of the plurality of sections 102a-i extend in a transverse direction transverse to a longitudinal direction 311 from the rear end 304 of the vehicle 300 to the front end 302 of the vehicle 300. For example, the longitudinal extensions 104 of the plurality of sections 102a-i, and/or the longitudinal direction of the plurality of sections 102a-i, may extend in a direction substantially perpendicular to the longitudinal direction 311 of the vehicle 300, and/or may extend substantially parallel to the lateral direction of the vehicle 300. Thus, the longitudinal direction of the the plurality of sections 102a-i may form an angle of approximately 90 degrees with the the longitudinal direction 311 of the vehicle 300. 300. It is to be understood that "substantially perpendicular" in this regard may encompass that the angle formed between said directions referred to is between 70 and 110 degrees, for example between 80 and 100 degrees.

With reference to FIGS. 5 to 10, the sections 102a-i of the plurality of sections 102a-i may be detachable in relation to one another. In the illustrated embodiment, the vehicle structure 100 includes nine sections 102a-i. However, any other number of sections 102a-i is possible. For alternative embodiments, the sections of the plurality of sections may be integrally formed with one another or may be arranged in any other way making them substantially undetachable in relation to one another.

Figure 7:
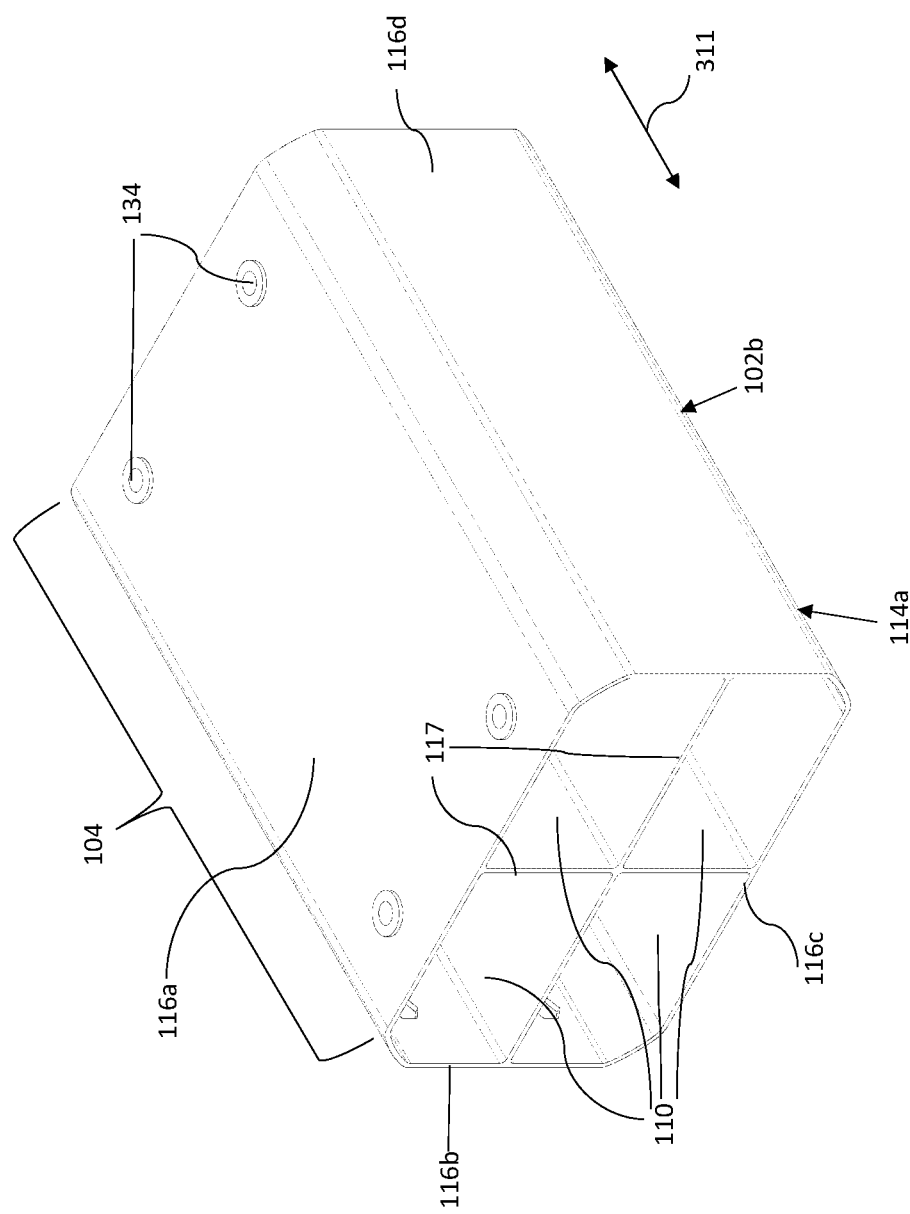
FIG. 7 is a schematic perspective view of an embodiment of a section of the plurality of sections of the FIG. 6.
Figure 8:
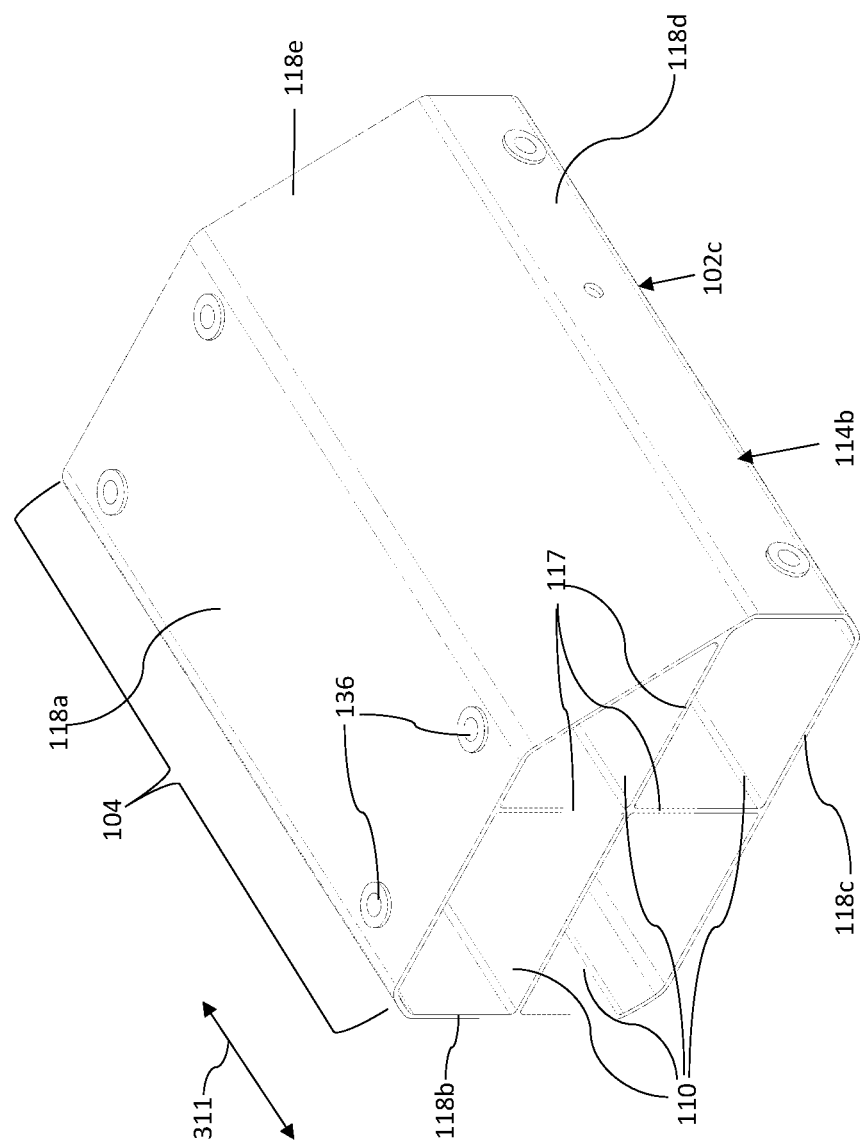
FIG. 8 is a schematic perspective view of another embodiment of a section of the plurality of sections of the FIG. 6.

With reference to FIGS. 5 to 9, for some embodiments, the section 102a-i of the plurality of sections 102a-i includes one or more tubular members 114a-b having a longitudinal extension 104 extending in the longitudinal direction 311. The tubular member 114a-b may form one or more longitudinal compartments 110 of the longitudinal compartments 110. The tubular members 114a-b of the plurality of sections 102a-i are arranged beside one another, or side-by-side, for example in, or in relation to, the longitudinal direction 311, so as to form the cellular structure 112. The plurality of sections 102a-i may be positioned, or may be configured to be positioned, such that the longitudinal extensions 104 of the tubular members 114a-b extend in a longitudinal direction 311 from the rear end 304 of the vehicle 300 to the front end 302 of the vehicle 300. The tubular member 114a-b may have one or more longitudinal walls 116a-d, 118a-e having a longitudinal extension 104 extending in the longitudinal direction 311. The one or more longitudinal walls 116a-d, 118a-e may form, or define, the one or more longitudinal compartments 110 of the tubular member 114a-b. When the section 102a-i of the plurality of sections 102a-i includes one or more tubular members 114a-b, the plurality of sections 102a-i may be configured to absorb impact energy while the tubular members 114a-b deform as a result of an impact. The longitudinal compartments 110 may be filled with one or more of the group of: a gas; a gas mixture; and air. For alternative embodiments, two or more tubular members 114a-b may share one or more longitudinal walls, i.e. two or more tubular members 114a-b may have one or more longitudinal walls in common. With reference to FIGS. 7 and 8, the section 102a-i or the tubular member 114a-b may include, or be provided with, internal walls 117, which may separate longitudinal compartments 110 from one another.

With reference to FIGS. 2 to 5, 9 and 10, the vehicle structure 100 may include a rear cover 120. The rear cover 120 includes a base 122. The rear cover 120 may cover the plurality of sections 102a-i. For example, it may be defined that the rear cover 120 covers the plurality of sections 102a-i when viewed from the rear end 304 of the vehicle 300 toward the front end 302 of the vehicle 300. When the vehicle structure 100 includes the rear cover 120, the plurality of sections 102a-i is positioned between the base 108 of the front cover 106 and the base 122 of the rear cover 120. For some embodiments, the structure of the rear cover 120 may essentially correspond to the structure of the front cover 106.

Figure 9:
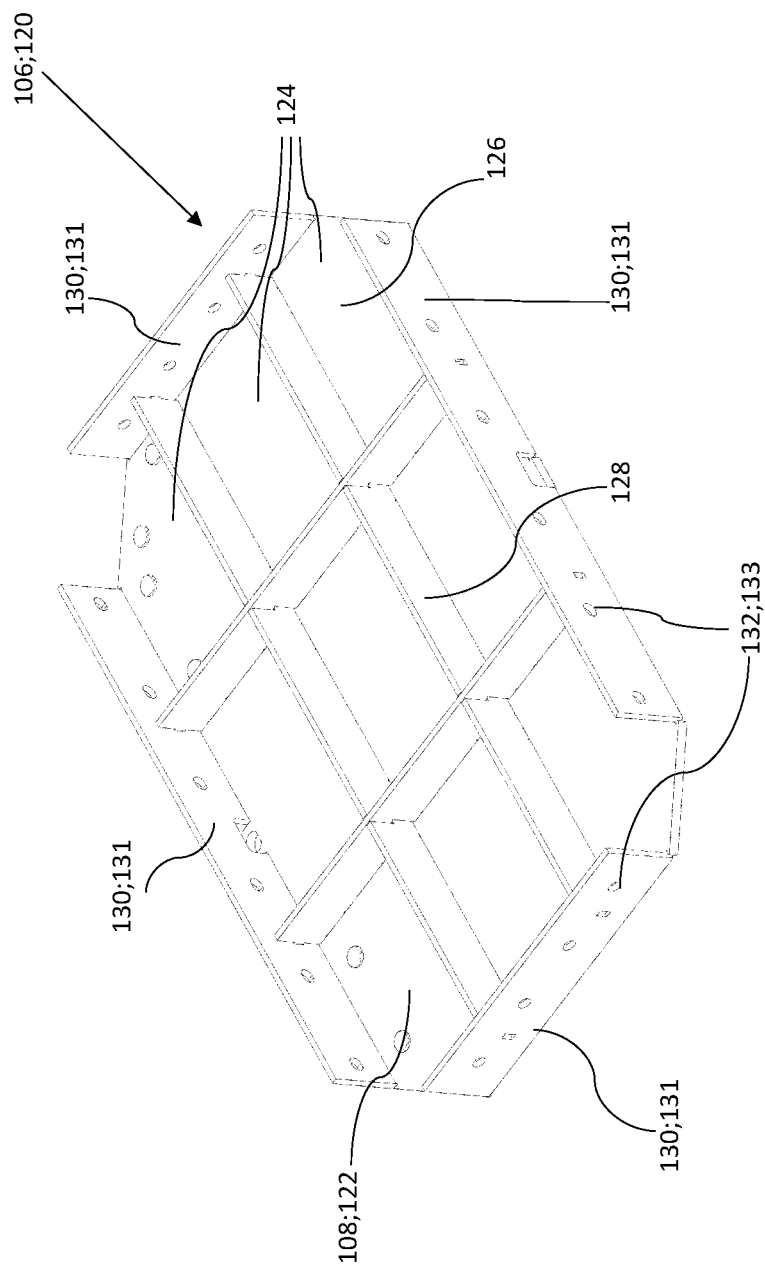
FIG. 9 is a schematic perspective view of an embodiment of the front or rear cover of the vehicle structure of FIG. 2.

With reference to FIG. 9, one or more of the front and rear covers 106, 120 may form cover compartments 124, more specifically on an inner side 126 of the front or rear cover 106, 120. The cover compartment 124 holds one section 102a-i of the plurality of sections 102a-i. One or more of the front and rear covers 106, 120 may include walls 128 defining the cover compartments 124. Further, for some embodiments, one or more of the front and rear covers 106, 120 may comprise one or more peripheral sides 130, 131 or walls. With reference to FIGS. 7 to 10, the front cover 106 may be attached to the plurality of sections 102a-i, for example by way of holes and/or through-holes and attachment elements, such as screws or bolts, received in the through-holes and/or holes. The rear cover 120 may be attached to the plurality of sections 102a-i, for example by way of holes and/or through-holes and attachment elements, such as screws or bolts, received in the through-holes and/or holes. More specifically, the peripheral side 130, 131 and the section 102a-i of the plurality of sections 102a-i may form through-holes 132, 133, 134, 136 for receiving attachment elements 138 (see FIG. 10), such as screws or bolts. The through-holes 132, 133, 134, 136 and the attachment elements 138 cooperate to attach one or more of the front and rear covers 106, 120 to at least some of the sections 102a-i of the plurality of sections 102a-i, whereby the sections 102a-i of the plurality of sections 102a-i, when being detachable, are kept together and fixed in positions in relation to one another and in relation to one or more of the front and rear covers 106, 120.

With reference to FIGS. 11 to 14, the vehicle structure 100 may include a stop 140 attachable, or attached, to the main body 306 of the vehicle 300, for example by way of holes and/or through-holes and attachment elements, such as screws or bolts, received in the holes and/or through-holes. The stop 140 is positioned, or configured to be positioned, between the plurality of sections 102a-i and the rear end 304 of the vehicle 300. The stop 140 may be described to be configured to stop and prevent an external object, for example a beam of a leading vehicle, from further penetration into the vehicle 300, for example in the longitudinal direction 311. The stop 140 may be positioned, or may be configured to be positioned, between the plurality of sections 102a-i and the compartment 322 for holding the one or more energy storage units 324. More specifically, the plurality of sections 102a-i may be positioned between the base 108 of the front cover 106 and the stop 140. More specifically, the base 122 of the rear cover 120 may be positioned between the plurality of sections 102a-i and the stop 140.

The stop 140 may include a wall 142 attachable, or attached, to the main body 306 of the vehicle 300, for example by way of holes and/or through-holes and attachment elements, such as screws or bolts, received in the holes and/or through-holes. The rear cover 120 may be attached to the stop 140, for example by way of holes and/or through-holes and attachment elements, such as screws or bolts, received in the holes and/or through-holes. Alternatively, or in addition thereto, the plurality of sections 102a-i may be attached to the stop 140.

With reference to FIGS. 1 and 11 to 14, for some embodiments, it may be defined that the stop 140 is adjacent to the compartment 322 for holding one or more energy storage units 324 and/or adjacent to the one or more energy storage units 324. For some embodiments, it may be defined that the stop 140 is adjacent to, and/or abuts against, the plurality of sections 102a-i or the rear cover 120. For some embodiments, it may be defined that the stop 140 is configured to protect the one or more energy storage units 324, for example held in the compartment 322 for holding one or more energy storage units 324. The stop 140 may be described as a stop for the plurality of sections 102a-i, for example during an impact. For some embodiments, the stop 140 may be described to be configured to hold the plurality of sections 102a-i, for example during an impact. For some embodiments, the stop 140 may be described to be configured to hold the plurality of sections 102a-i in position during an impact. For some embodiments, the stop 140 may be configured to prevent a further movement of the plurality of sections 102a-i during an impact, for example in a direction toward the rear end 304 of the vehicle 300. For some embodiments, the stop 140 is more rigid in relation to the plurality of sections 102a-i, whereby an efficient deformation of the plurality of sections 102a-i is attained, and the performance and energy absorption of the vehicle structure 100 is further improved.

With reference to FIGS. 11 to 14, the vehicle structure 100 may include a base attachment 144 attached to the stop 140 and attachable, or attached, to a main body 306 of a vehicle 300 comprising wheels 310, for example by way of holes and/or through-holes and attachment elements, such as screws or bolts, received in the holes and/or through-holes. The base attachment 144 is positioned, or configured to be positioned, below the plurality of sections 102a-i when the wheels 310 of the vehicle rest on the ground 330. The base attachment 144 may be attachable, or attached, to the main body 306 of the vehicle 300 at one or more positions between the front end 302 of the vehicle 300 and the plurality of sections 102a-i, for example attachable, or attached, to a transverse beam 317 of the main body 306. Upon impact, the base attachment 144 and/or the stop 140 may be configured to counteract, or prevent, a rotation of one or more of the vehicle structure 100, stop 140 and plurality of sections 102a-i about a lateral, or transverse, axis which extends transversely to the longitudinal direction 311 of the vehicle 300, and possibly also to counteract, or prevent, a rotation of one or more of the vehicle structure 100, base 140 and plurality of sections 102a-i about a longitudinal axis. For some embodiments, the stop 140 is configured to distribute impact energy.

Figure 12:
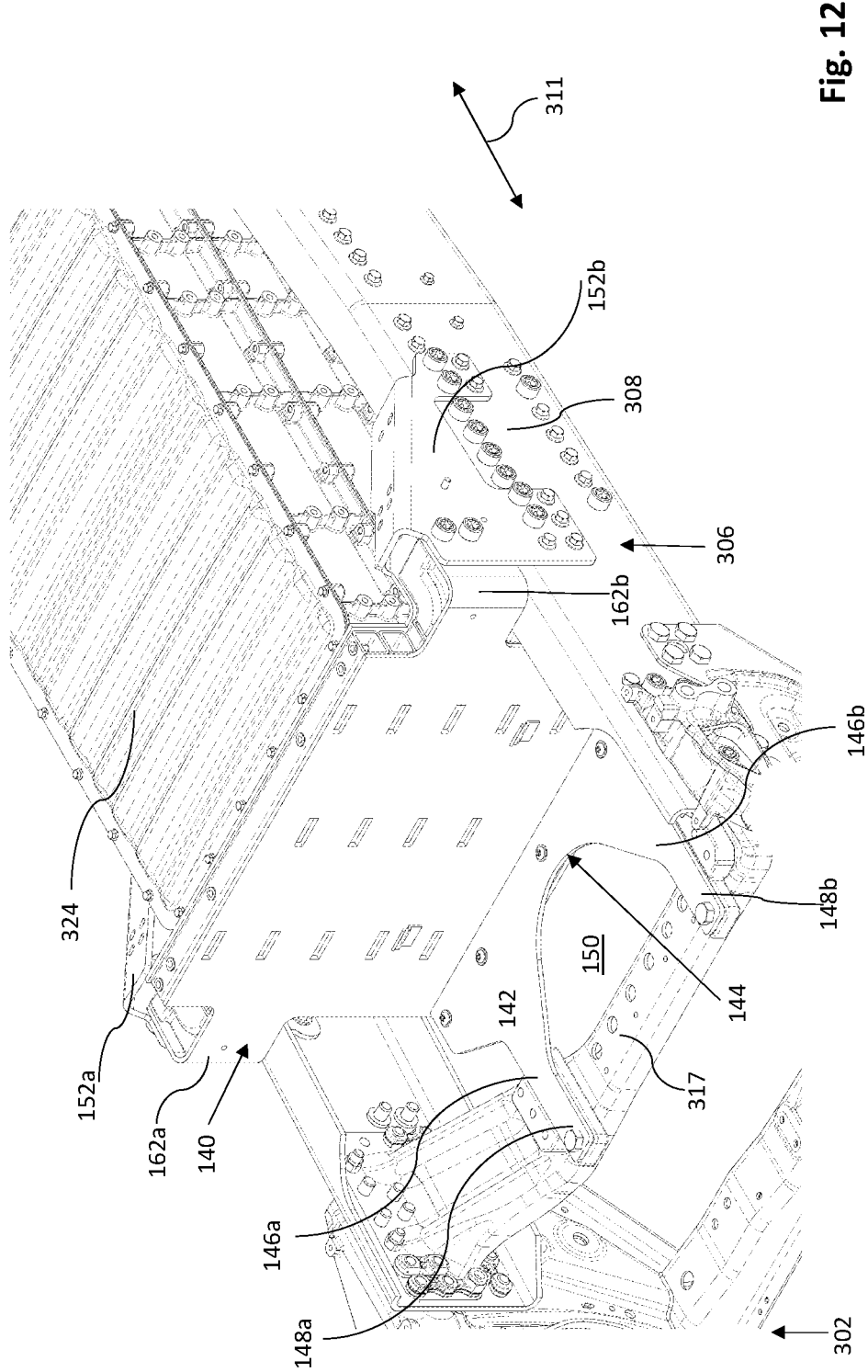
FIG. 12 is a schematic perspective front view of the stop of FIG. 11 together with an energy storage unit.
Figure 13:
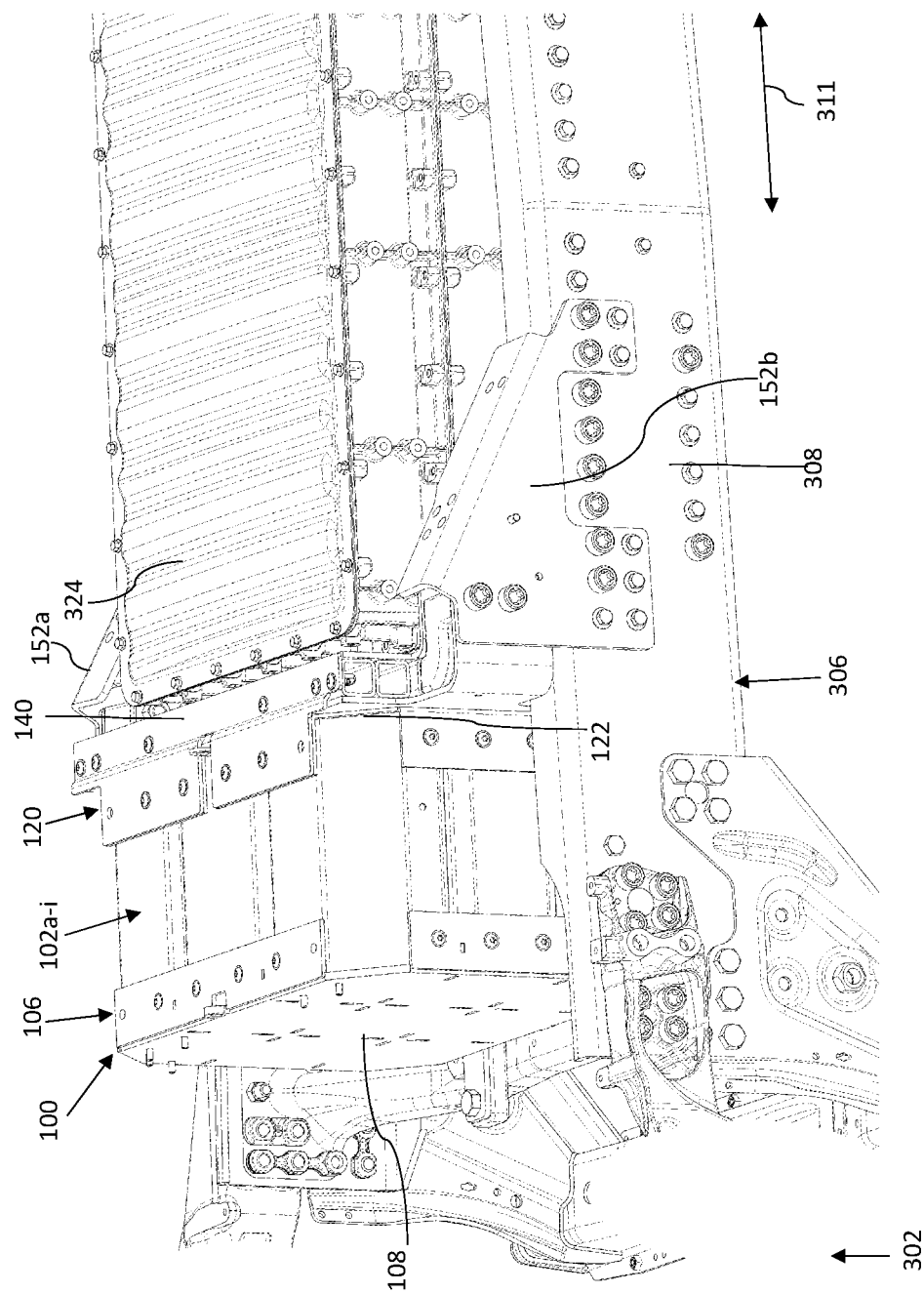
FIG. 13 is a schematic perspective side view of the vehicle structure of FIG. 2 together with an energy storage unit.
Figure 14:
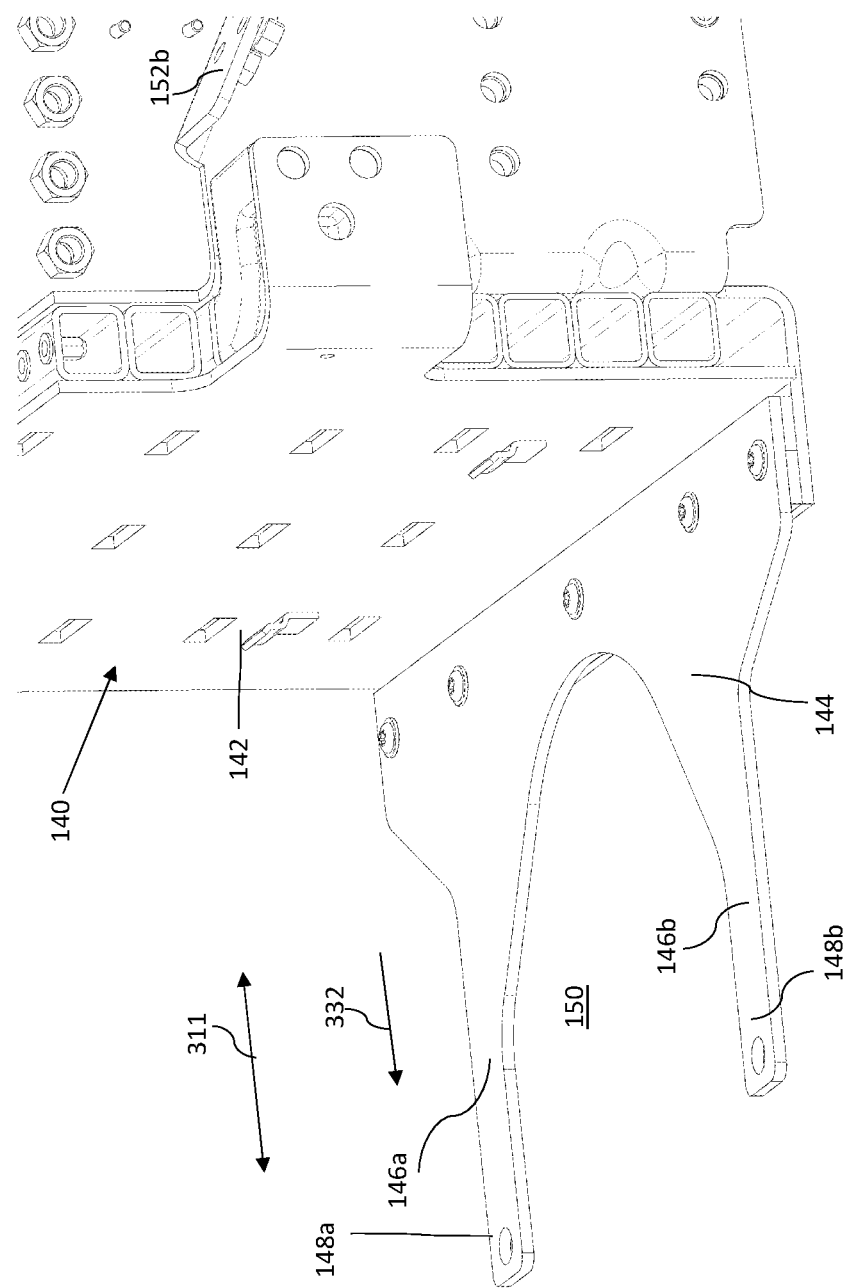
FIG. 14 is a schematic partial perspective side view of the stop of FIG. 11.
Figure 15:
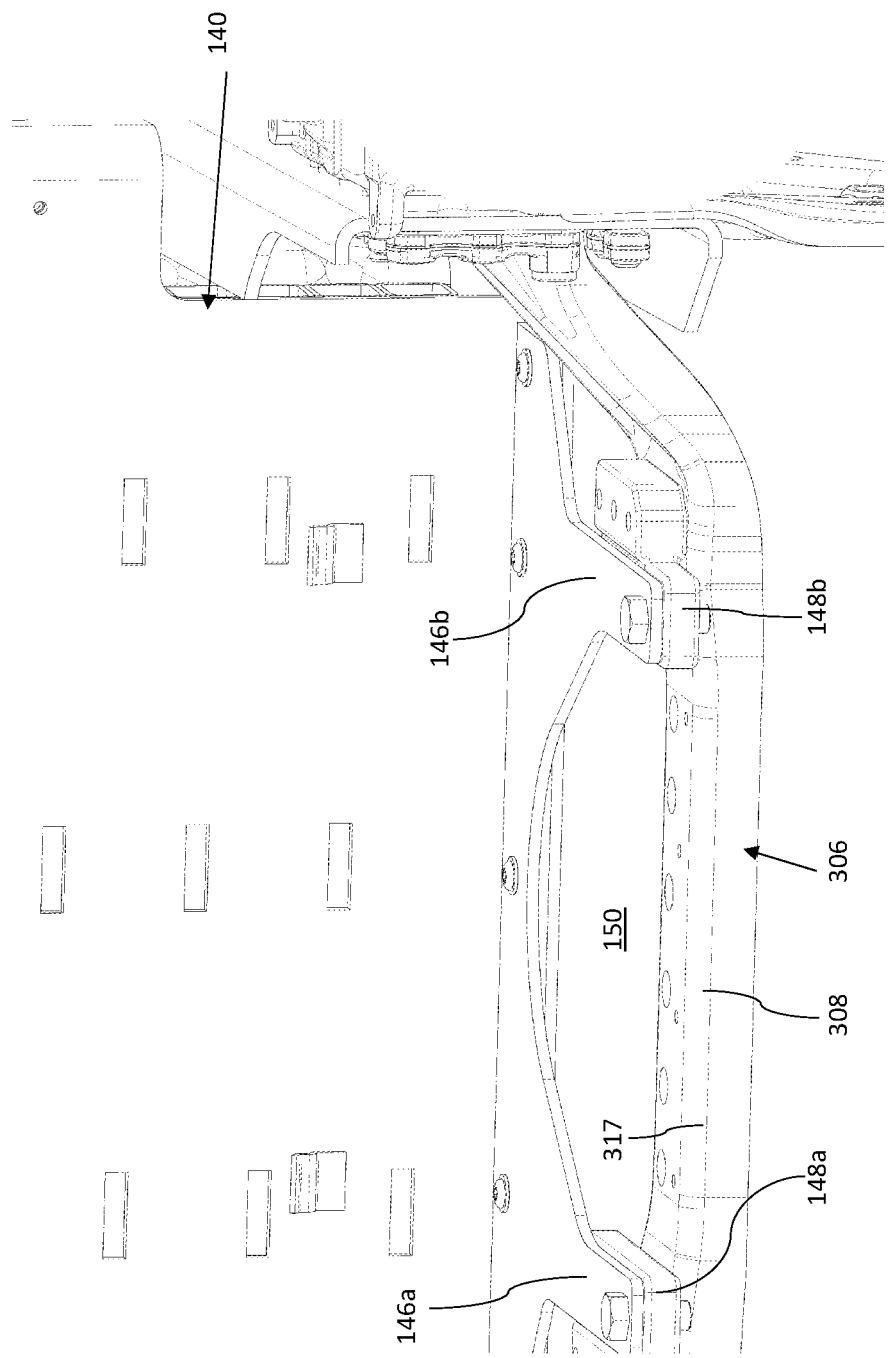
FIG. 15 is a schematic partial perspective front view of the stop of FIG. 11.

With reference to FIGS. 12, 14 and 15, the base attachment 144 may include two legs 146a-b. The base attachment 144 may be attached, or configured to be attached, to the main body 306 of the vehicle 300 such that the leg 146a-b points in a direction 332 toward the front end 302 of the vehicle 300. The leg 146a-b includes an end portion 148a-b. The end portions 148a-b of the legs 146a-b are spaced apart from one another such that the base attachment 144 forms a space 150 between the legs 146a-b. The end portion 148a-b of the leg 146a-b is attachable, or attached, to the main body 306 of the vehicle 300, for example to a transverse beam 317 of the main body 306, for example by way of holes and/or through-holes and attachment elements, such as screws or bolts, received in the holes and/or through-holes. The end portion 148a-b of the leg 146a-b is attachable, or attached, to the main body 306 of the vehicle 300 at one or more positions between the front end 302 of the vehicle 300 and the plurality of sections 102a-i.

With reference to FIGS. 11 to 19, the vehicle structure 100 may include two lateral attachments 152a-b attached to the stop 140, for example by way of holes and/or through-holes and attachment elements, such as screws or bolts, received in the holes and/or through-holes. The stop 140 may be positioned between the two lateral attachments 152a-b. The lateral attachment 152a-b has a longitudinal extension 154a-b (see FIG. 17) extending in a longitudinal direction 311. The lateral attachment 152a-b is attachable, or attached, to the main body 306 of the vehicle 300 such that the longitudinal extension 154a-b of the lateral attachment 152a-b extends in a longitudinal direction 311 from the front end 302 of the vehicle 300 to the rear end 304 of the vehicle 300. The lateral attachment 152a-b may be attachable, or may be attached, to the main body 206 of the vehicle 300 such that the longitudinal extension 154a-b of the lateral attachment 152a-b extends from the stop 140 in a direction 334 toward the rear end 304 of the vehicle 300. For example, the lateral attachment 152a-b is attachable, or attached, to the main body 306 of the vehicle 300 by way of holes and/or through-holes and attachment elements, such as screws or bolts, received in the holes and/or through-holes.

Figure 17:
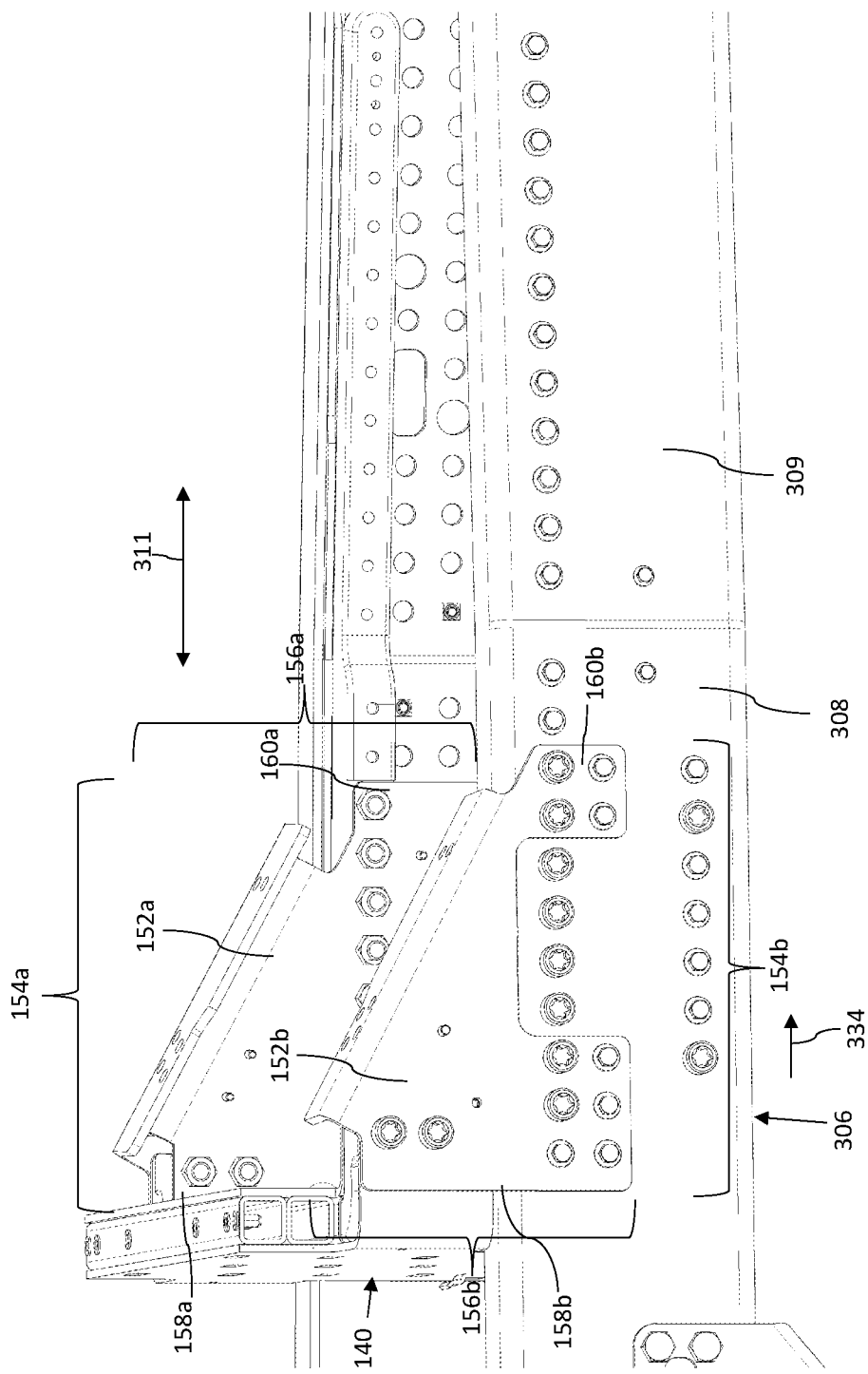
FIG. 17 is a schematic perspective side view of the vehicle structure of FIG. 16.
Figure 18:
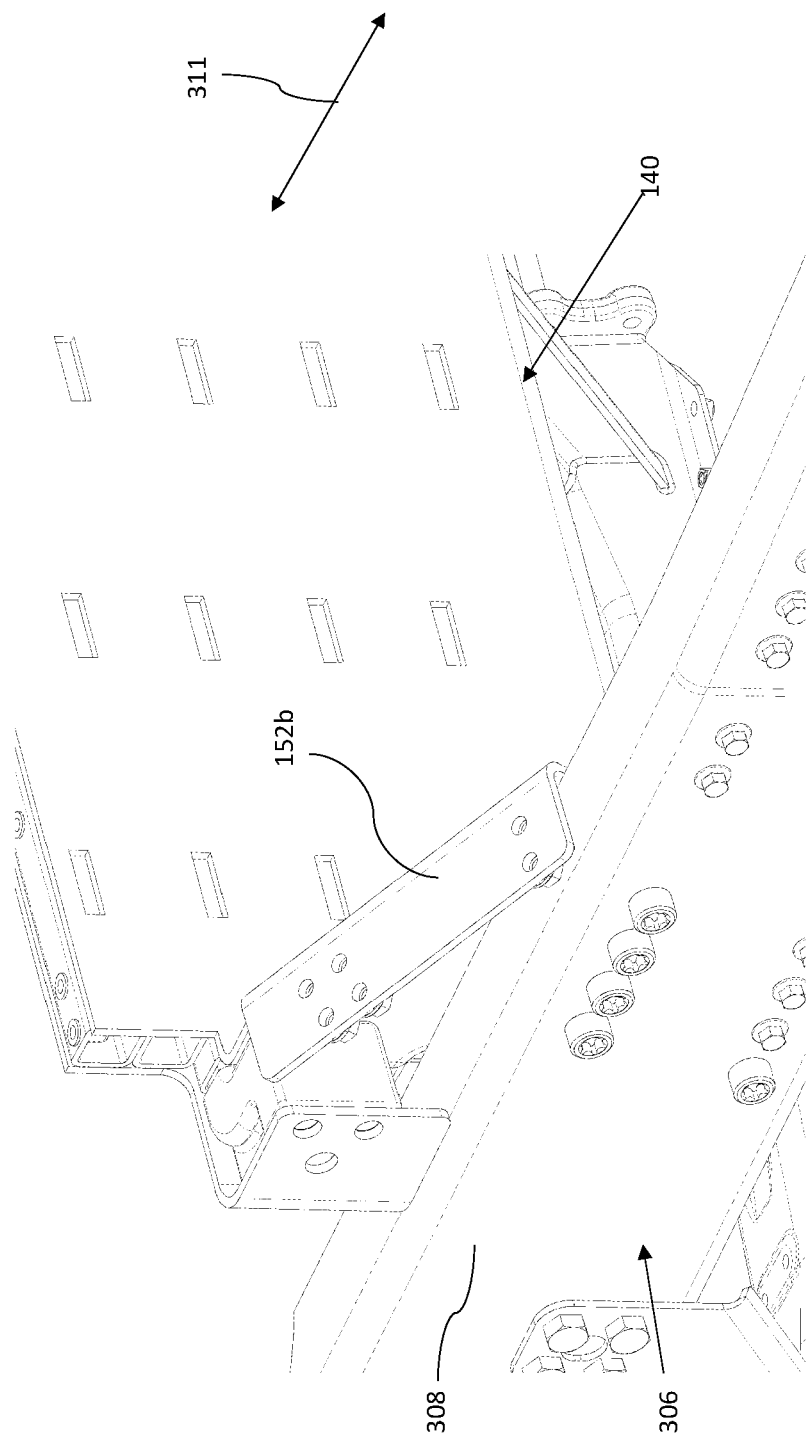
FIG. 18 is an enlargement of the vehicle structure of FIG. 16.

With reference to FIG. 17, the lateral attachment 152a-b may have a transverse extension 156a-b. The lateral attachment 152a-b may have a front end 158a-b and a rear end 160a-b. The front end 158a-b of the lateral attachment 152a-b is attached to the stop 140 and is positioned between the stop 140, or the wall 142 of the stop 140, and the rear end 160a-b of the lateral attachment 152a-b. The transverse extension 156a-b of the front end 158a-b of the lateral attachment 152a-b exceeds the transverse extension 156a-b of the rear end 160a-b of the lateral attachment 152a-b.

With reference to FIG. 12, the stop 140 may include two curved corners 162a-b. The wall 142 of the stop 140 may extend from one 162a-b of the two curved corners 162a-b to the other one 162a-b of the two curved corners 162a-b. One 162a-b of the two curved corners 162a-b adjoins one 152a-b of the two lateral attachments 152a-b while the other one 162a-b of the two curved corners 162a-b adjoins the other one 152a-b of the two lateral attachments 152a-b.

Figure 16:
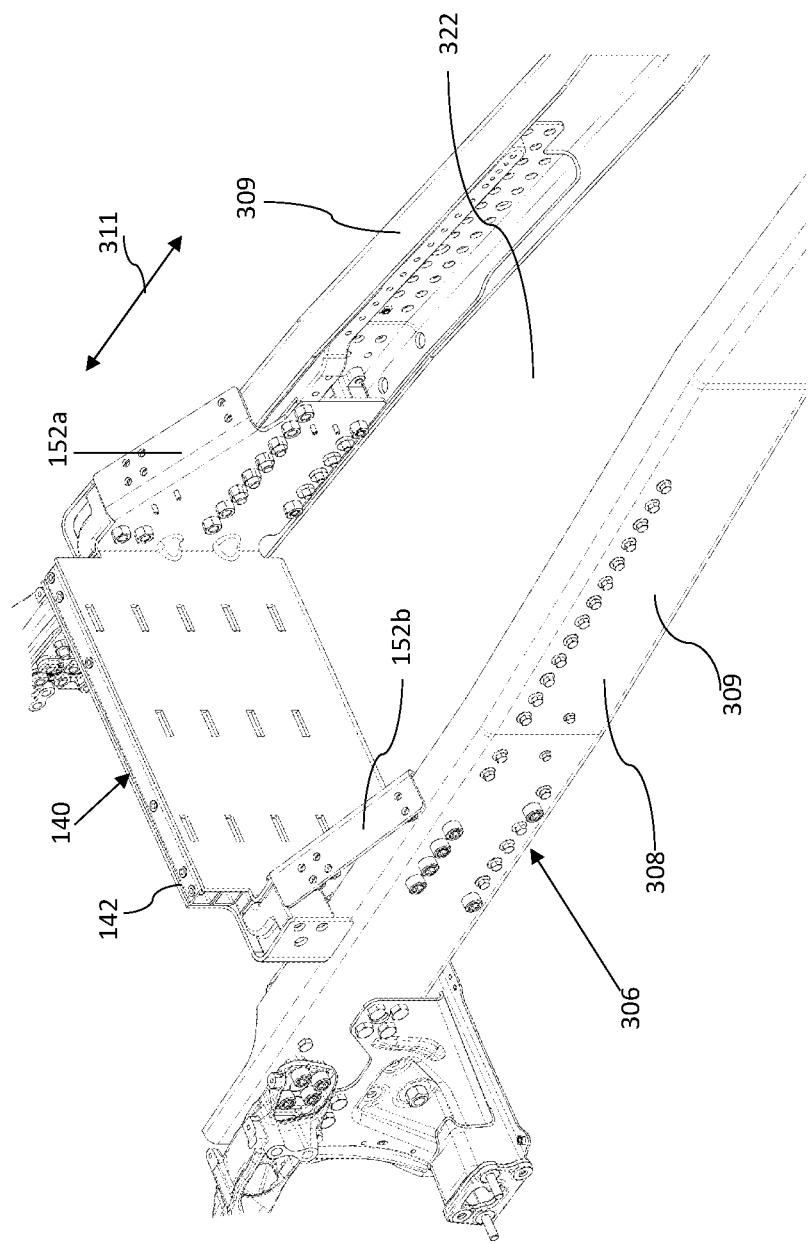
FIG. 16 is a schematic perspective rear view of the vehicle structure of FIG. 2, wherein the plurality of sections and the front and rear covers are absent for illustrative purposes.

With reference to FIGS. 12 and 16, the lateral attachments 152a-b may be attached, or attachable, to the main body 306 of the vehicle 300 such that the compartment 322 for holding one or more energy storage units 324 is positioned between the two lateral attachments 152a-b.

Figure 19:
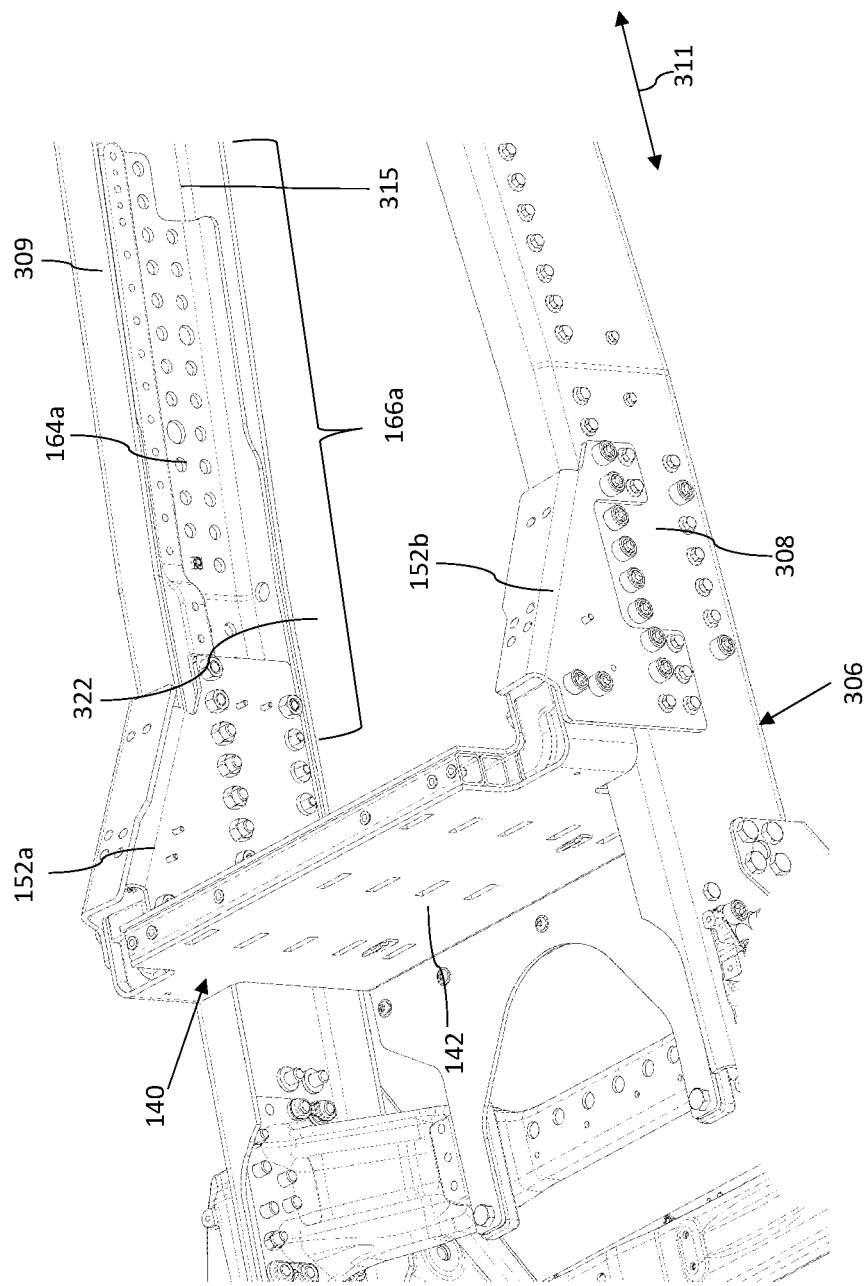
FIG. 19 is a schematic perspective side view of the vehicle structure of FIG. 2, wherein the plurality of sections and the front and rear covers are absent for illustrative purposes.
Figure 20:
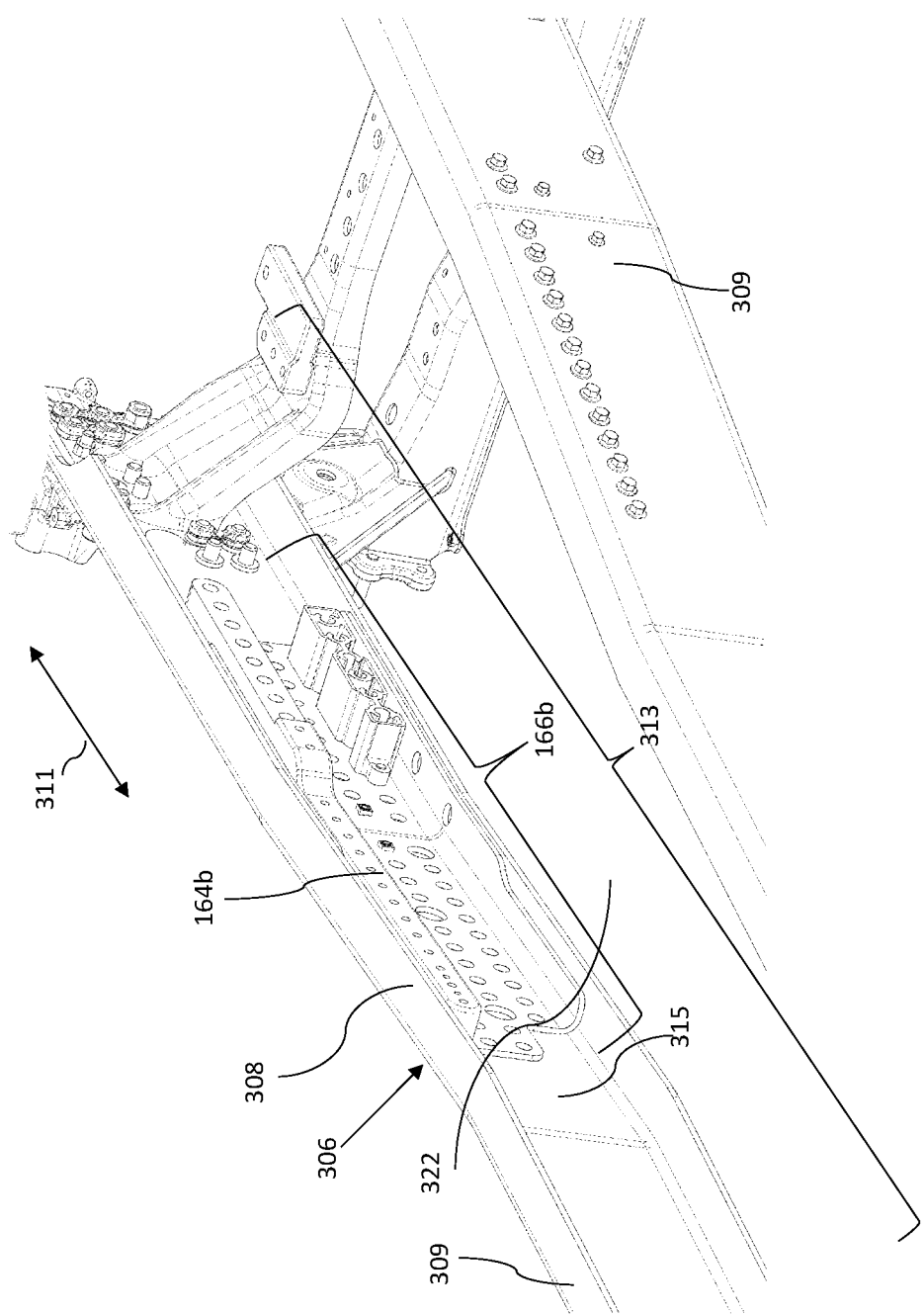
FIG. 20 is a schematic perspective rear view of the vehicle structure of FIG. 16, wherein the stop and the lateral attachments are excluded for illustrative purposes.
Figure 21:
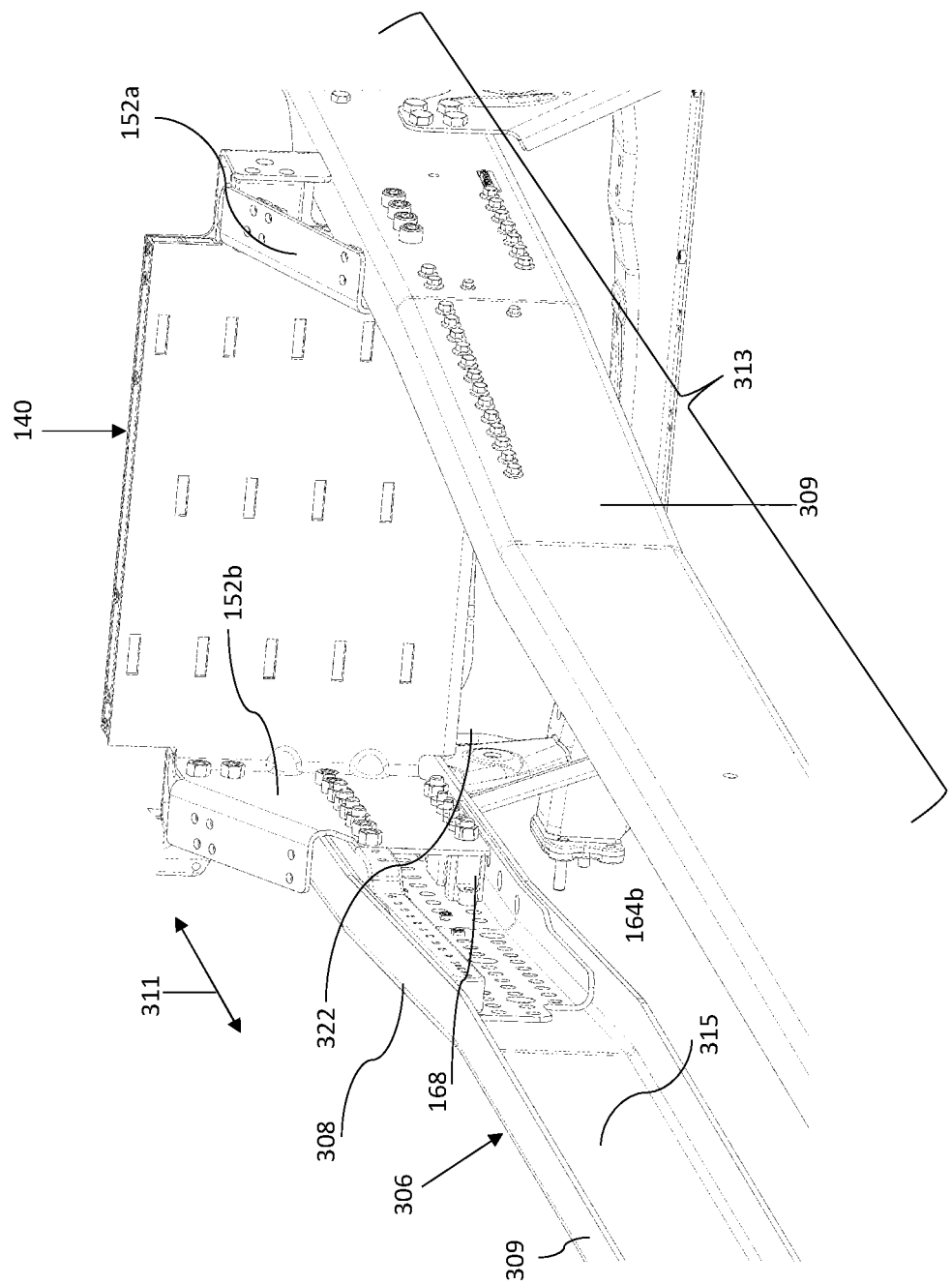
FIG. 21 is a schematic perspective rear view of the vehicle structure of FIG. 16.

With reference to FIGS. 19 and 21, the vehicle structure 100 may include one or more reinforcement elements 164a-b for reinforcing one or more longitudinal beams 309 of a main frame 308 of the main body 306 of the vehicle 300. The reinforcement element 164a-b has a longitudinal extension 166a-b extending in a longitudinal direction 311. The reinforcement element 164a-b is attachable, or attached, to the longitudinal beam 309 so as to reinforce the longitudinal beam 309. For example, the reinforcement element 164a-b is attachable, or attached, to the longitudinal beam 309 by way of holes and/or through-holes and attachment elements, such as screws or bolts, received in the holes and/or through-holes. The lateral attachment 152a-b is attached to the reinforcement element 164a-b. The reinforcement element 164a-b may be attachable, or attached, to the longitudinal beam 309 such that the longitudinal extension 166a-b of the reinforcement element 164a-b extends in a longitudinal direction 311 from the rear end 304 of the vehicle 300 to the front end 302 of the vehicle 300. The reinforcement element 164a-b may be attachable, or attached, to a longitudinal beam 309 having a longitudinal extension 313 extending in a longitudinal direction 311 from the rear end 304 of the vehicle 300 to the front end 302 of the vehicle 300. The reinforcement element 164a-b may be attachable, or attached, to an inner side 315 of the longitudinal beam 309. The inner side 315 of the longitudinal beam 309 may face the compartment 322 for holding one or more energy storage units 324. The lateral attachment 152a-b may be attached to the reinforcement element 164a-b by way of holes and/or through-holes and attachment elements, such as screws or bolts, received in the holes and/or through-holes, and possibly by way of spacers 168.

For some embodiments, the plurality of sections 102a-i may be made of a material comprising or consisting of a metal or a metal alloy. One or more of the front cover 106, rear cover 120, stop 140, base attachment 144, lateral attachment 152a-b and reinforcement element 164a-b may be made of a material comprising or consisting of a metal or a metal alloy. However, other materials are possible. The section 102a-i of the plurality of sections 102a-i may be extruded, or produced in any other suitable manner, such as by casting.

Figure 22A:
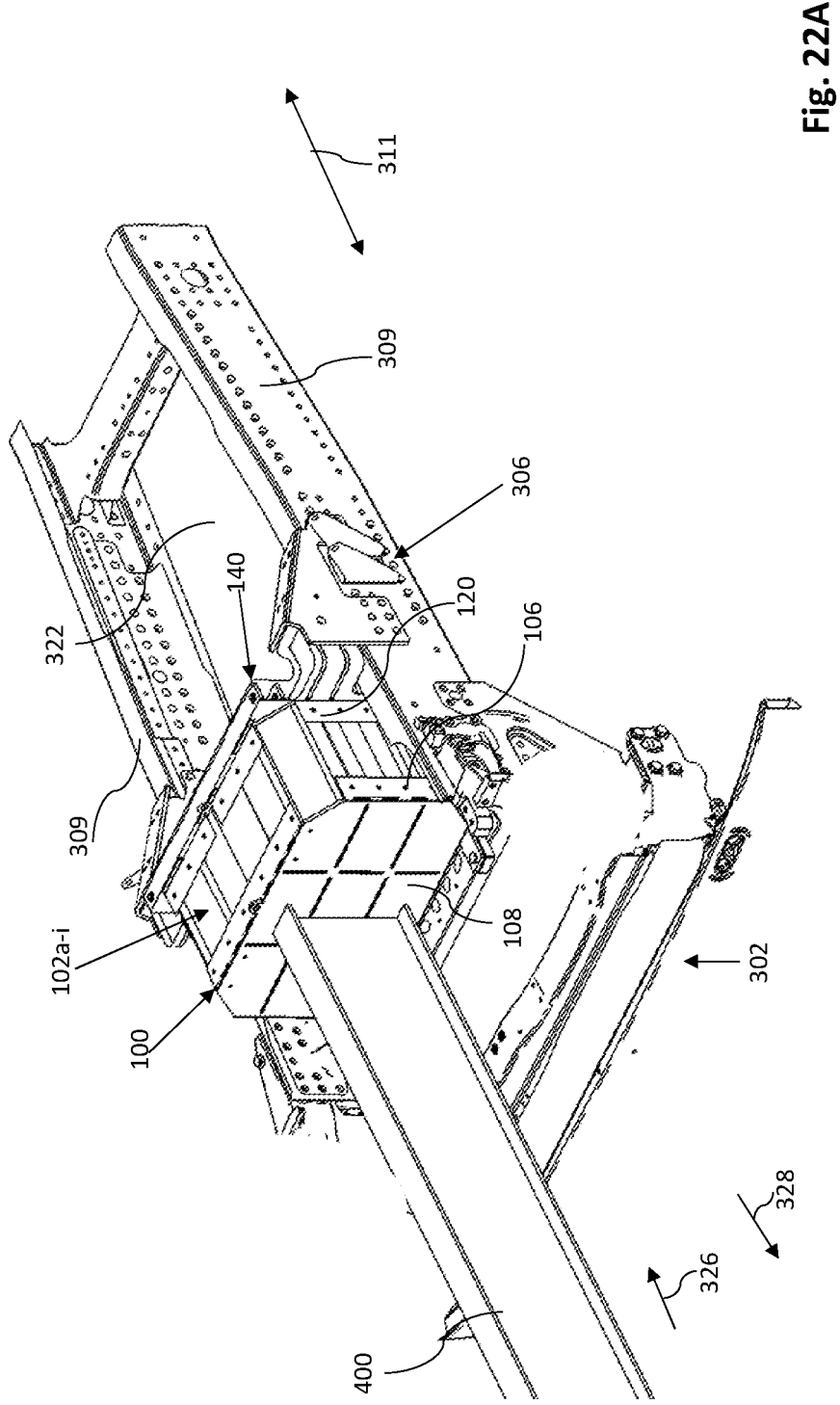
FIGS. 22A-C schematically illustrate when the vehicle structure of FIG. 2 applied to the vehicle of FIG. 1 is subjected to an impact by a longitudinal beam of a leading vehicle.
Figure 22B:
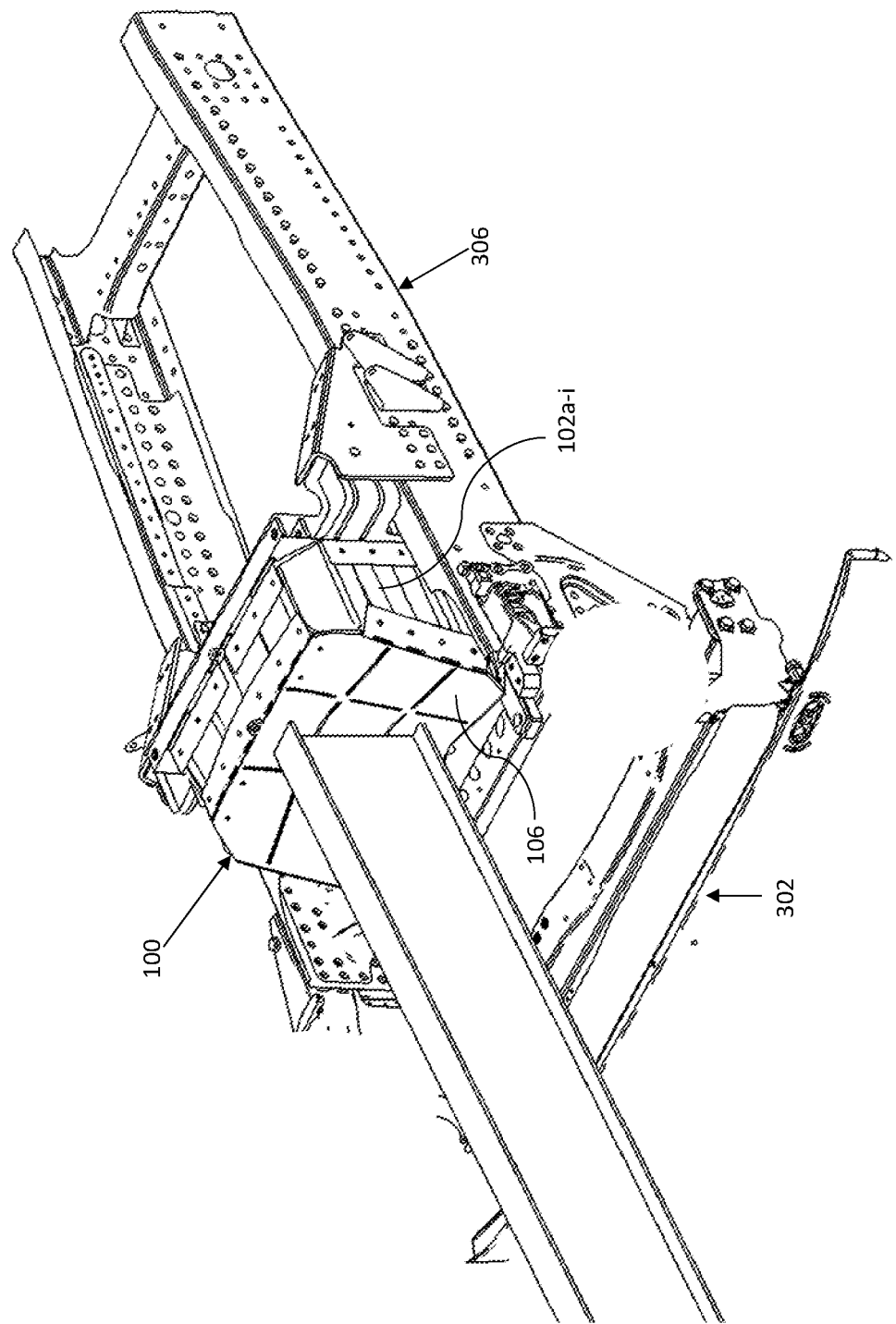
Figure 22C:
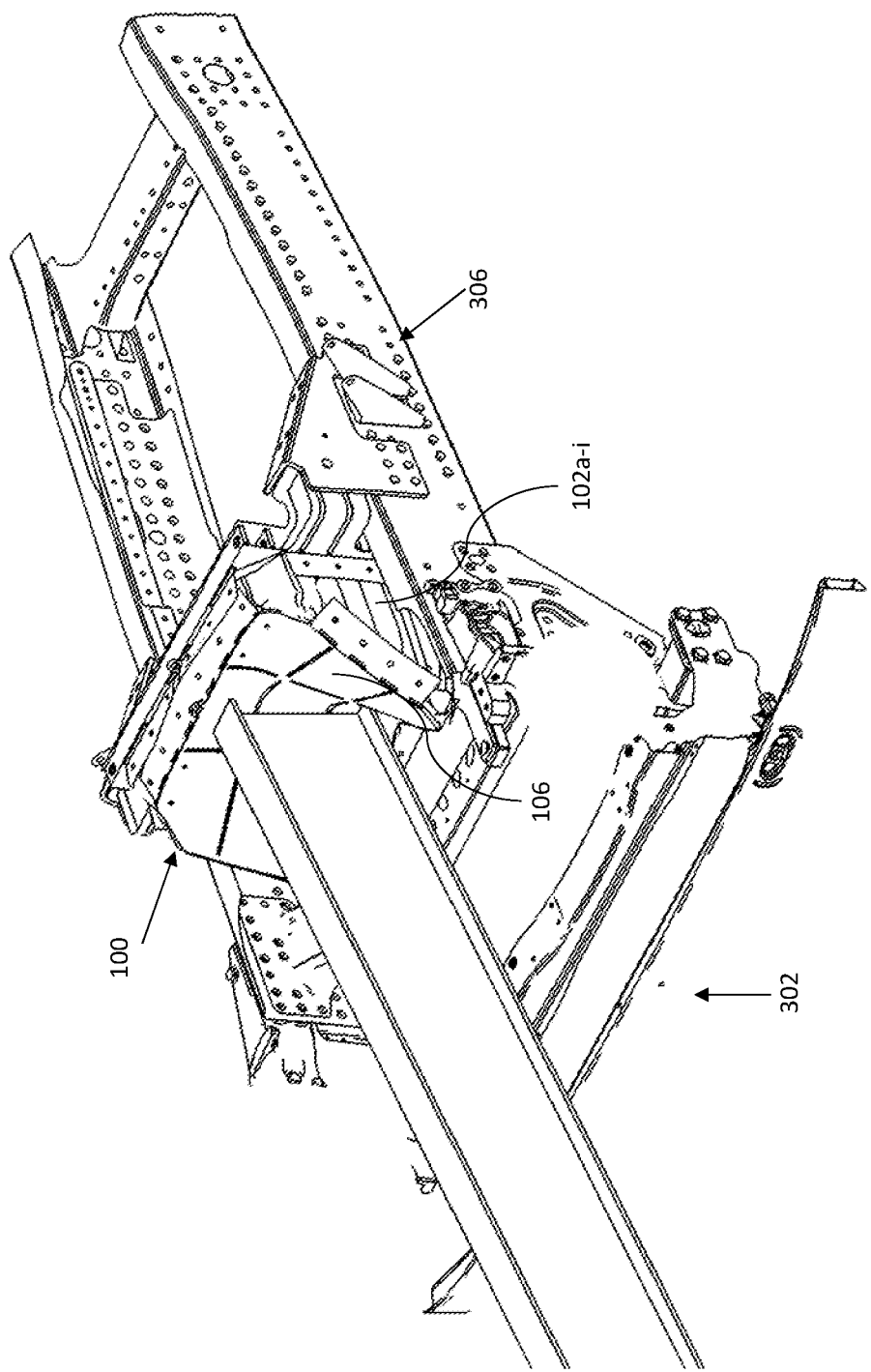
Figure 23A:
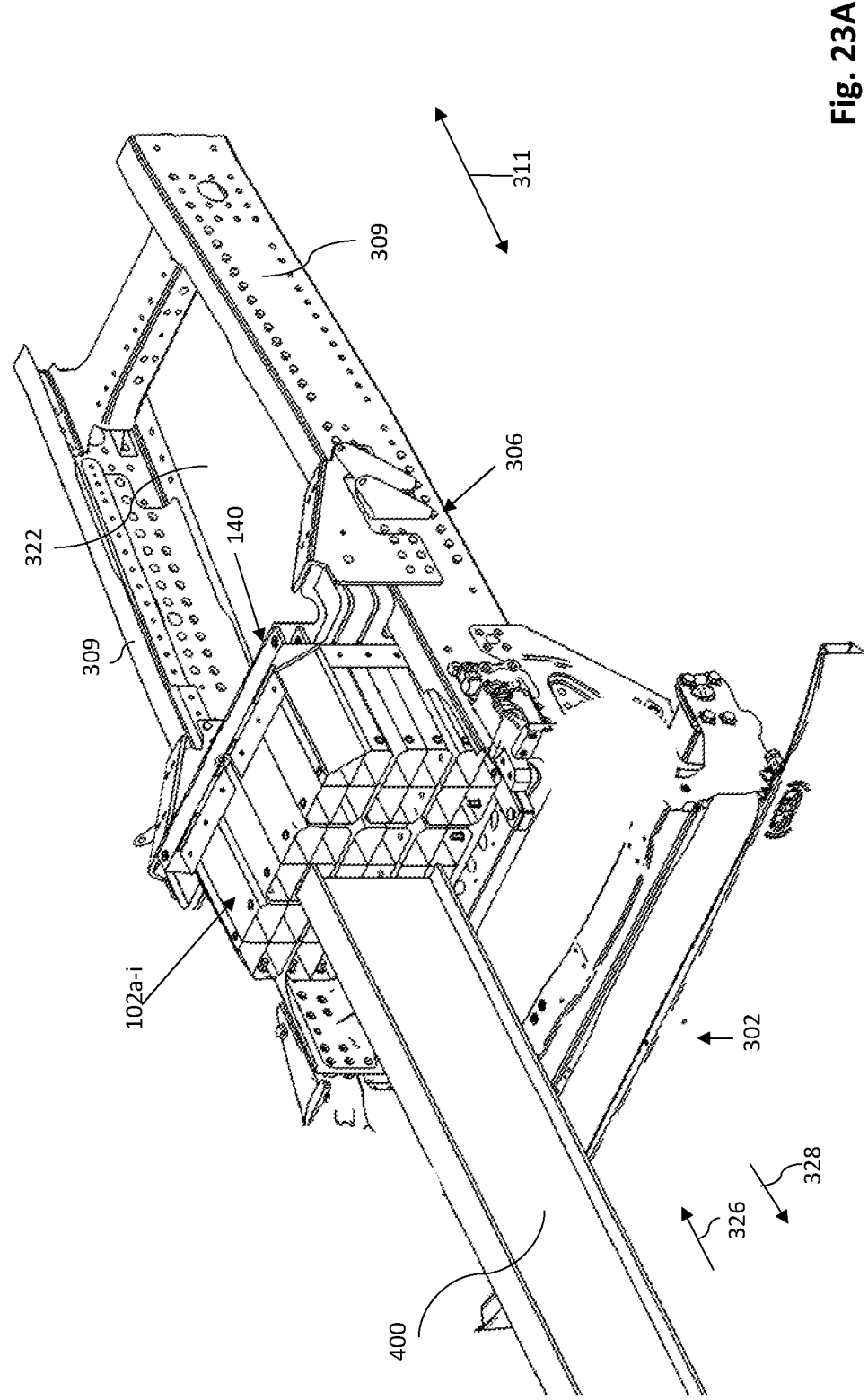
FIGS. 23A-C schematically illustrate when the vehicle structure of FIG. 2 applied to the vehicle of FIG. 1 is subjected to an impact by a longitudinal beam of a leading vehicle but with the front cover removed for illustrative purposes.
Figure 23B:
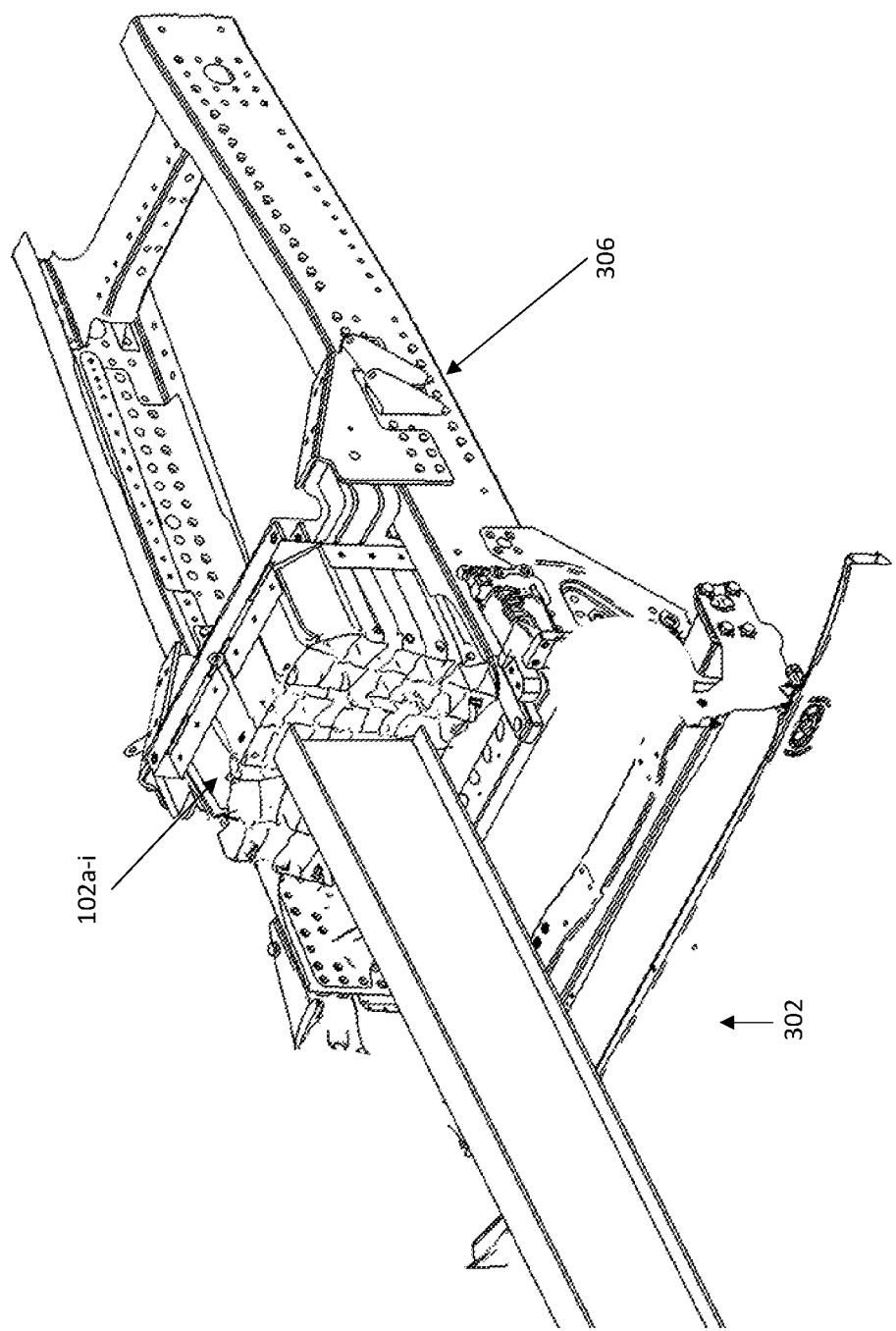
Figure 23C:
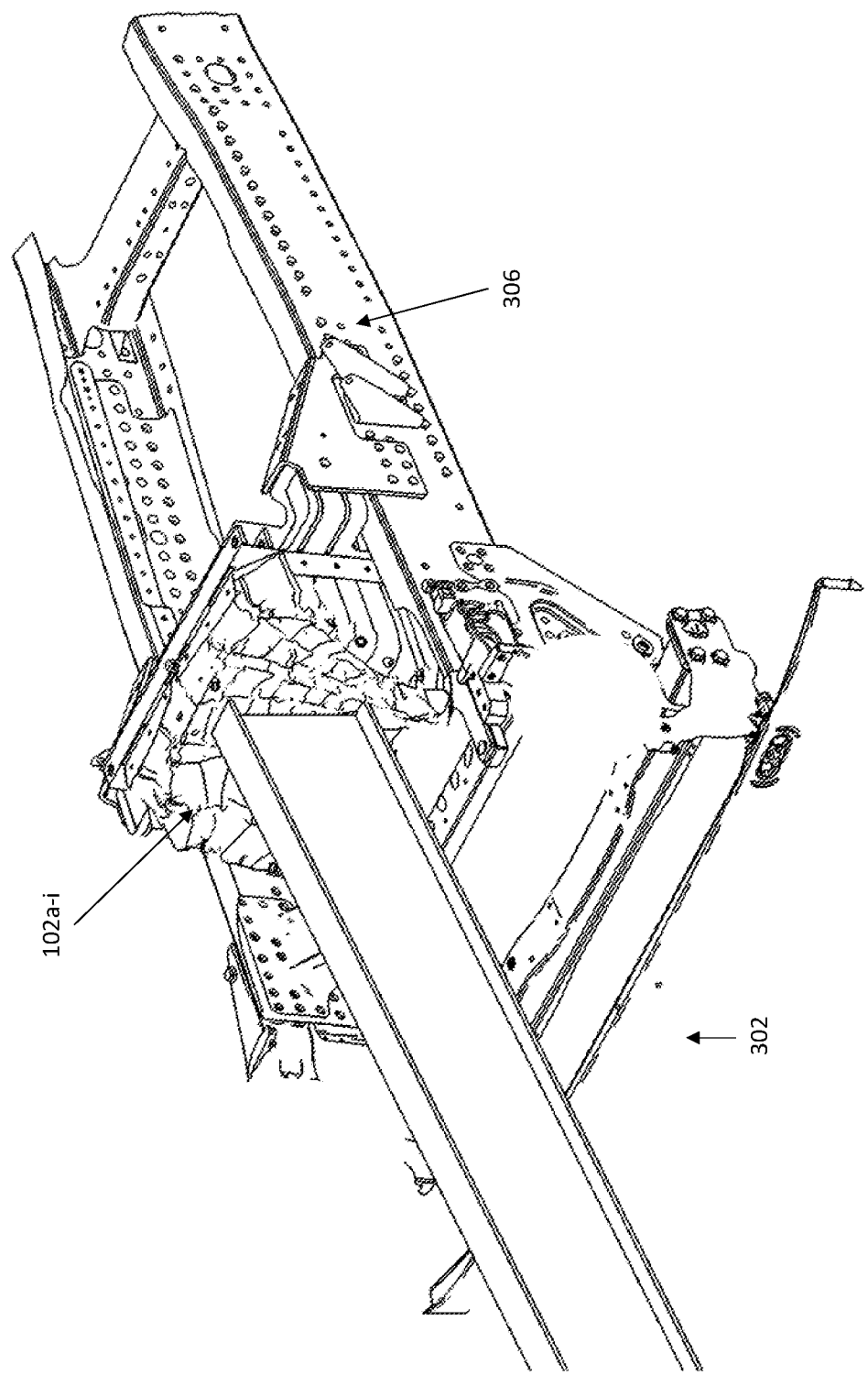

FIGS. 22A-C and 23A-C schematically illustrate when the vehicle structure 100 applied to the vehicle 300 is subjected to an impact by a longitudinal beam 400 of a leading vehicle, i.e. a leading vehicle in front of the vehicle 300 when the vehicle 300 travels in a forward direction 328 and crashes its front end 302 into the rear end of the leading vehicle, such as the rear end of a trailer of the leading vehicle, wherein the rear end of the trailer of the leading vehicle includes said longitudinal beam 400. These kinds of accidents may be referred to as "trailer back accidents". The event involving a longitudinal beam 400 of a leading vehicle penetrating into the trailing vehicle 300 may be called "forking". When the vehicle 300 had a combustion engine, in general, the combustion engine represented a decent impact protection for "trailer back accidents" and "forking". However, when the combustion engine is absent, for example in a BEV, the impact protection provided by the combustion engine is also absent. Instead, the innovate vehicle structure 100 provides an efficient impact protection, for example upon "trailer back accidents" and "forking", but also for other types of accidents, collisions, or impacts. In FIGS. 23A-C, the front cover 106 is absent for illustrative purposes to more clearly illustrate the deformation of the sections 102a-i.

FIGS. 22A and 23A schematically illustrate when the longitudinal beam 400 of the leading vehicle, such as of the trailer of the leading vehicle, has reached the front cover 106 and may be in physical contact with the front cover 106.

FIGS. 22B and 23B schematically illustrate when the longitudinal beam 400 of the leading vehicle has crashed into the front cover 106 and has buckled to the front cover 106. The front cover 106 has started to distribute impact energy to the plurality of sections 102a-i, and the sections 102a-i have started to deform while absorbing impact energy.

FIGS. 22C and 23C schematically illustrate when the longitudinal beam 400 of the leading vehicle is stopped by the stop 140 after the sections 102a-i have deformed more and absorbed more impact energy in relation to FIGS. 22B and 23B.

The present invention is not limited to the above-described embodiments. Instead, the present invention relates to, and encompasses all different embodiments being included within the scope of the appended independent claim.

The invention claimed is:

1. A vehicle structure for impact protection, wherein the vehicle structure is attachable to a main body of a vehicle having a front end and a rear end, wherein the vehicle structure comprises:
   a plurality of sections having a longitudinal extension extending in a longitudinal direction; and
   a front cover comprising a base,
   wherein the sections of the plurality of sections forms one or more longitudinal compartments,
   wherein the sections of the plurality of sections are arranged beside one another so as to form a cellular structure,
   wherein the base of the front cover is configured to be positioned between the front end of the vehicle and the plurality of sections, and
   wherein the front cover covers the plurality of sections and is configured to distribute impact energy to the plurality of sections.

2. A vehicle structure according to claim 1,
   wherein the vehicle structure is attachable to the main body of a vehicle, where the vehicle comprises wheels and a cabin at least for a driver of the vehicle, and
   wherein the plurality of sections is configured to be positioned below the cabin when the wheels of the vehicle rest on the ground.

3. A vehicle structure according to claim 1,
   wherein the vehicle structure is attachable to the main body, where the main body comprises a compartment for holding one or more energy storage units, and
   wherein the plurality of sections is configured to be positioned between the front end of the vehicle and the compartment for holding the one or more energy storage units.

4. A vehicle structure according to claim 1, wherein the plurality of sections is configured to be positioned such that the longitudinal extensions of the plurality of sections extend in a longitudinal direction from the rear end of the vehicle to the front end of the vehicle.

5. A vehicle structure according to claim 1,
   wherein the section of the plurality of sections comprises one or more tubular members having a longitudinal extension extending in the longitudinal direction,
   wherein the tubular member forms one or more longitudinal compartments of the longitudinal compartments, and
   wherein the tubular members of the plurality of sections are arranged beside one another so as to form the cellular structure.

6. A vehicle structure according to claim 1,
   wherein the vehicle structure comprises a rear cover comprising a base,
   wherein the rear cover covers the plurality of sections, and
   wherein the plurality of sections is positioned between the base of the front cover and the base of the rear cover.

7. A vehicle structure according to claim 1,
wherein the vehicle structure comprises a stop attachable to the main body of the vehicle, and
wherein the stop is configured to be positioned between the plurality of sections and the rear end of the vehicle.

8. A vehicle structure according to claim 7, wherein the stop is configured to be positioned between the plurality of sections and a compartment for holding the one or more energy storage units.

9. A vehicle structure according to claim 7, wherein the plurality of sections is positioned between the base of the front cover and the stop.

10. A vehicle structure according to claim 7,
wherein the vehicle structure comprises two lateral attachments attached to the stop,
wherein the stop is positioned between the two lateral attachments,
wherein the lateral attachment has a longitudinal extension extending in a longitudinal direction, and
wherein the lateral attachment is attachable to the main body of the vehicle such that the longitudinal extension of the lateral attachment extends in a longitudinal direction from the front end of the vehicle to the rear end of the vehicle.

11. A vehicle structure according to claim 10,
wherein the vehicle structure comprises one or more reinforcement elements for reinforcing one or more longitudinal beams of a main frame of the main body of the vehicle,
wherein the reinforcement element has a longitudinal extension extending in a longitudinal direction,
wherein the reinforcement element is attachable to the longitudinal beam so as to reinforce the longitudinal beam, and
wherein the lateral attachment is attached to the reinforcement element.

12. A vehicle structure according to claim 1,
wherein the longitudinal compartment extends from a first end of the cellular structure to a second end of the cellular structure, and
wherein the front cover is arranged at the first end of the cellular structure and covers the first end of the cellular structure.

13. A vehicle having a front end, a rear end and a main body between the front and rear ends, wherein the vehicle comprises a vehicle structure for impact protection, wherein the vehicle structure is attachable to the main body of the vehicle, wherein the vehicle structure comprises:
a plurality of sections having a longitudinal extension extending in a longitudinal direction; and
a front cover comprising a base,
wherein the sections of the plurality of sections forms one or more longitudinal compartments,
wherein the sections of the plurality of sections are arranged beside one another so as to form a cellular structure,
wherein the base of the front cover is configured to be positioned between the front end of the vehicle and the plurality of sections, and
wherein the front cover covers the plurality of sections and is configured to distribute impact energy to the plurality of sections.

14. A vehicle according to claim 13,
wherein the main body comprises a compartment for holding one or more energy storage units, and
wherein the plurality of sections is positioned between the front end of the vehicle and the compartment for holding the one or more energy storage units.

15. A vehicle according to claim 13, wherein the vehicle comprises: wheels, and a cabin at least for a driver of the vehicle,
wherein the plurality of sections is positioned below the cabin when the wheels of the vehicle rest on the ground.

16. A vehicle according to claim 13,
wherein the vehicle structure is attachable to the main body of a vehicle, where the vehicle comprises wheels and a cabin at least for a driver of the vehicle, and
wherein the plurality of sections is configured to be positioned below the cabin when the wheels of the vehicle rest on the ground.

17. A vehicle according to claim 13,
wherein the vehicle structure is attachable to the main body comprising a compartment for holding one or more energy storage units, and
wherein the plurality of sections is configured to be positioned between the front end of the vehicle and the compartment for holding the one or more energy storage units.

18. A vehicle according to claim 13, wherein the plurality of sections is configured to be positioned such that the longitudinal extensions of the plurality of sections extend in a longitudinal direction from the rear end of the vehicle to the front end of the vehicle.

19. A vehicle according to claim 13,
wherein the section of the plurality of sections comprises one or more tubular members having a longitudinal extension extending in the longitudinal direction,
wherein the tubular member forms one or more longitudinal compartments of the longitudinal compartments, and
wherein the tubular members of the plurality of sections are arranged beside one another so as to form the cellular structure.

20. A vehicle according to claim 13,
wherein the vehicle structure comprises a rear cover comprising a base,
wherein the rear cover covers the plurality of sections, and
wherein the plurality of sections is positioned between the base of the front cover and the base of the rear cover.

* * * * *